(12) United States Patent  (10) Patent No.: US 8,862,793 B2
Ando  (45) Date of Patent: Oct. 14, 2014

(54) STORAGE SYSTEM, CONTROL DEVICE, AND STORAGE SYSTEM CONTROL METHOD OF CONTROLLING STORAGE SYSTEM

(71) Applicant: Fujitsu Limited, Kawasaki (JP)

(72) Inventor: Shun Ando, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/675,004

(22) Filed: Nov. 13, 2012

(65) Prior Publication Data

US 2013/0159562 A1  Jun. 20, 2013

(30) Foreign Application Priority Data

Dec. 19, 2011 (JP) .................................. 2011-277332

(51) Int. Cl.
*G06F 13/00* (2006.01)
*G06F 15/167* (2006.01)
*G06F 15/173* (2006.01)
*G06F 11/00* (2006.01)

(52) U.S. Cl.
USPC ............... 710/22; 709/212; 709/224; 714/37; 714/38.11; 714/E11.025

(58) Field of Classification Search
None
See application file for complete search history.

(56) References Cited

U.S. PATENT DOCUMENTS

| | | | |
|---|---|---|---|
| 6,681,348 B1 * | 1/2004 | Vachon | 714/45 |
| 6,831,571 B2 * | 12/2004 | Bartel | 340/854.6 |
| 7,426,658 B2 | 9/2008 | Yoshida et al. | |
| 7,707,462 B1 | 4/2010 | Harris | |
| 8,245,085 B2 * | 8/2012 | Ueba | 714/45 |
| 2006/0143534 A1 * | 6/2006 | Dall | 714/38 |
| 2006/0218345 A1 | 9/2006 | Yoshida et al. | |
| 2011/0078520 A1 * | 3/2011 | Nakai | 714/57 |
| 2012/0254667 A1 * | 10/2012 | Zhang et al. | 714/38.11 |

FOREIGN PATENT DOCUMENTS

| | | |
|---|---|---|
| JP | 09-160884 | 6/1997 |
| JP | 11-338838 | 12/1999 |
| WO | WO-2005-073858 A2 | 8/2005 |

OTHER PUBLICATIONS

Extended European Search Report dated Feb. 14, 2013 for corresponding European Application No. 12190348.8.
Chinese Office Action issued Jun. 5, 2014 for corresponding China Patent Application 201210495301.7, with English Translation, 14 pages.

* cited by examiner

*Primary Examiner* — Michael Sun
(74) *Attorney, Agent, or Firm* — Fujitsu Patent Center

(57) ABSTRACT

A storage system includes a disk and a controller module (CM). The CM includes a main control unit and a sub control unit that distribute and execute processing in the CM. Further the CM includes a plurality of channel adapters (CAs) that receive commands related to the input and the output of the data stored in the disk from a host computer. The main control unit requests the sub control unit to copy dump data of a first CA among the plurality of CAs when detecting abnormality of the first CA while copying dump data of a second CA among the plurality of CAs according to abnormality of the second CA.

6 Claims, 17 Drawing Sheets

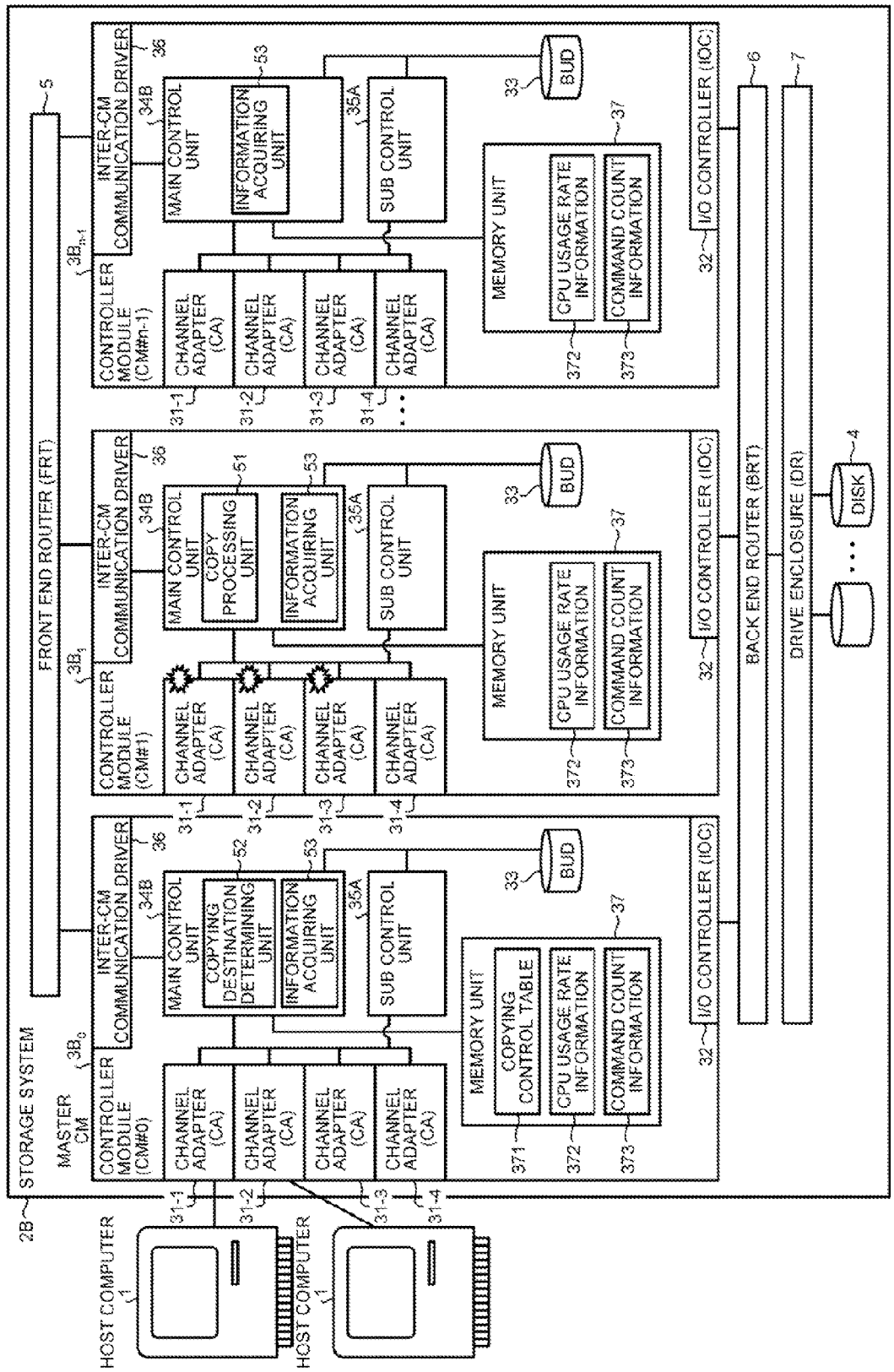

FIG.4

| CPU | ACTIVE FLAG | COPYING TARGET CA | CA DUMP COPYING TIME [SECOND] | CPU USAGE RATE | CA DUMP COPYING EXECUTION TIME [SECOND] | NUMBER OF I/O COMMANDS | I/O PROCESSING TIME [SECOND] |
|---|---|---|---|---|---|---|---|
| CM#0 MAIN CPU | OFF | — | 50 | 0.8 | 250 | CROSS 100/ STRAIGHT 100 | 2 |
| CM#0 SUB CPU | OFF | — | 50 | 0.8 | 250 | CROSS 120/ STRAIGHT 100 | 2.2 |
| CM#1 MAIN CPU | OFF | — | 45 | 0.2 | 56.3 | CROSS 50/ STRAIGHT 50 | 1 |
| CM#1 SUB CPU | OFF | — | 45 | 0.3 | 64.3 | CROSS 50/ STRAIGHT 50 | 1 |
| CM#2 MAIN CPU | OFF | — | 50 | 0.4 | 83.3 | CROSS 80/ STRAIGHT 70 | 1.5 |
| CM#2 SUB CPU | OFF | — | 50 | 0.1 | 55.6 | CROSS 80/ STRAIGHT 90 | 1.7 |
| CM#3 MAIN CPU | OFF | — | 50 | 0.5 | 100 | CROSS 100/ STRAIGHT 100 | 2 |
| CM#3 SUB CPU | OFF | — | 50 | 0.5 | 100 | CROSS 100/ STRAIGHT 90 | 1.9 |
| CM#4 MAIN CPU | OFF | — | 50 | 0.5 | 100 | CROSS 110/ STRAIGHT 100 | 2.1 |
| CM#4 SUB CPU | OFF | — | 50 | 0.5 | 100 | CROSS 110/ STRAIGHT 110 | 2.2 |
| CM#5 MAIN CPU | OFF | — | 50 | 0.3 | 71.4 | CROSS 100/ STRAIGHT 100 | 2 |
| CM#5 SUB CPU | OFF | — | 50 | 0.2 | 62.5 | CROSS 100/ STRAIGHT 100 | 2 |
| CM#6 MAIN CPU | OFF | — | 50 | 0.5 | 100 | CROSS 40/ STRAIGHT 40 | 0.8 |
| CM#6 SUB CPU | OFF | — | 50 | 0.5 | 100 | CROSS 60/ STRAIGHT 50 | 1.1 |
| CM#7 MAIN CPU | OFF | — | 50 | 0.1 | 55.6 | CROSS 80/ STRAIGHT 80 | 1.6 |
| CM#7 SUB CPU | ON | CM#1-CA#0 | 50 | 0.1 | 55.6 | CROSS 40/ STRAIGHT 50 | 0.9 |

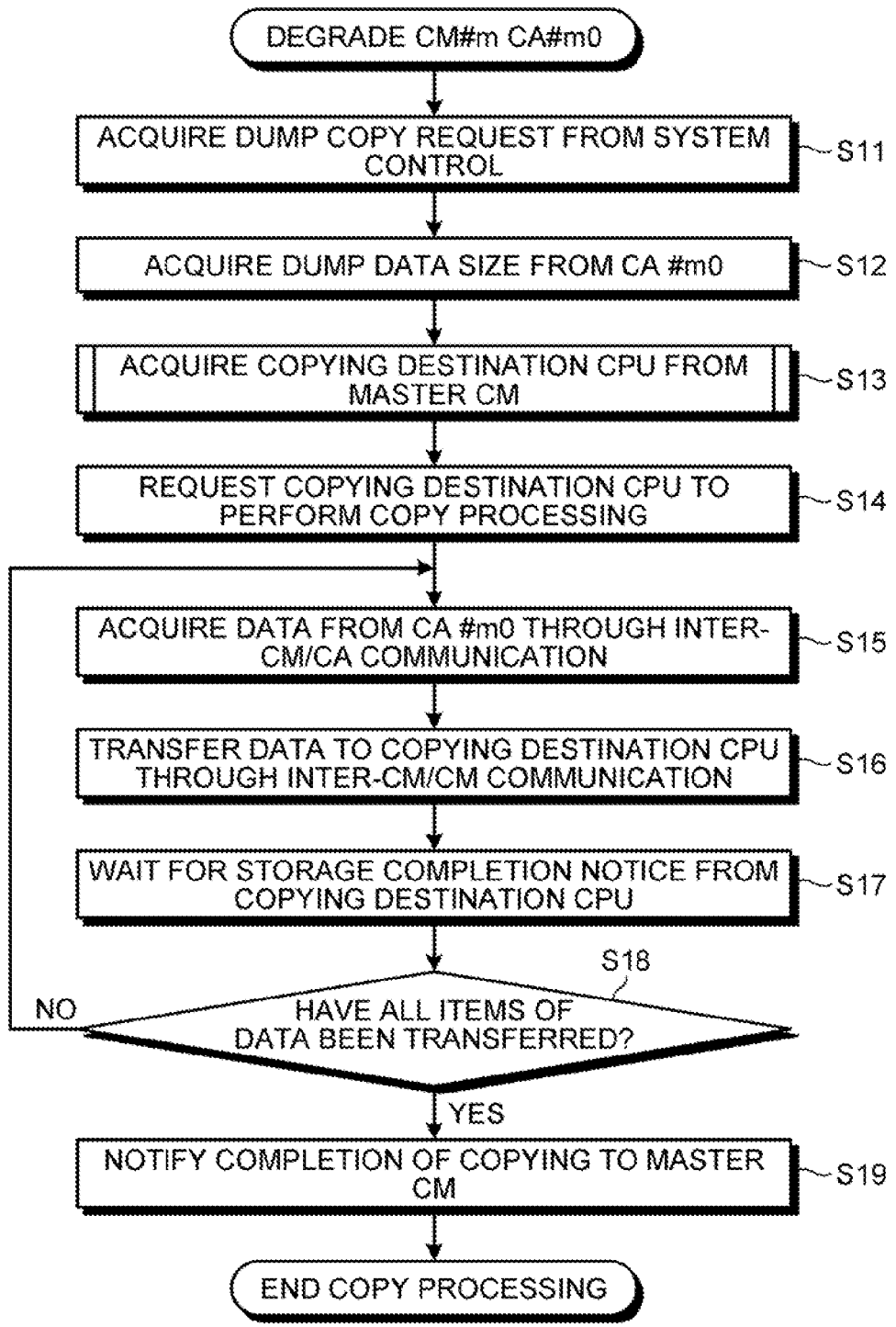

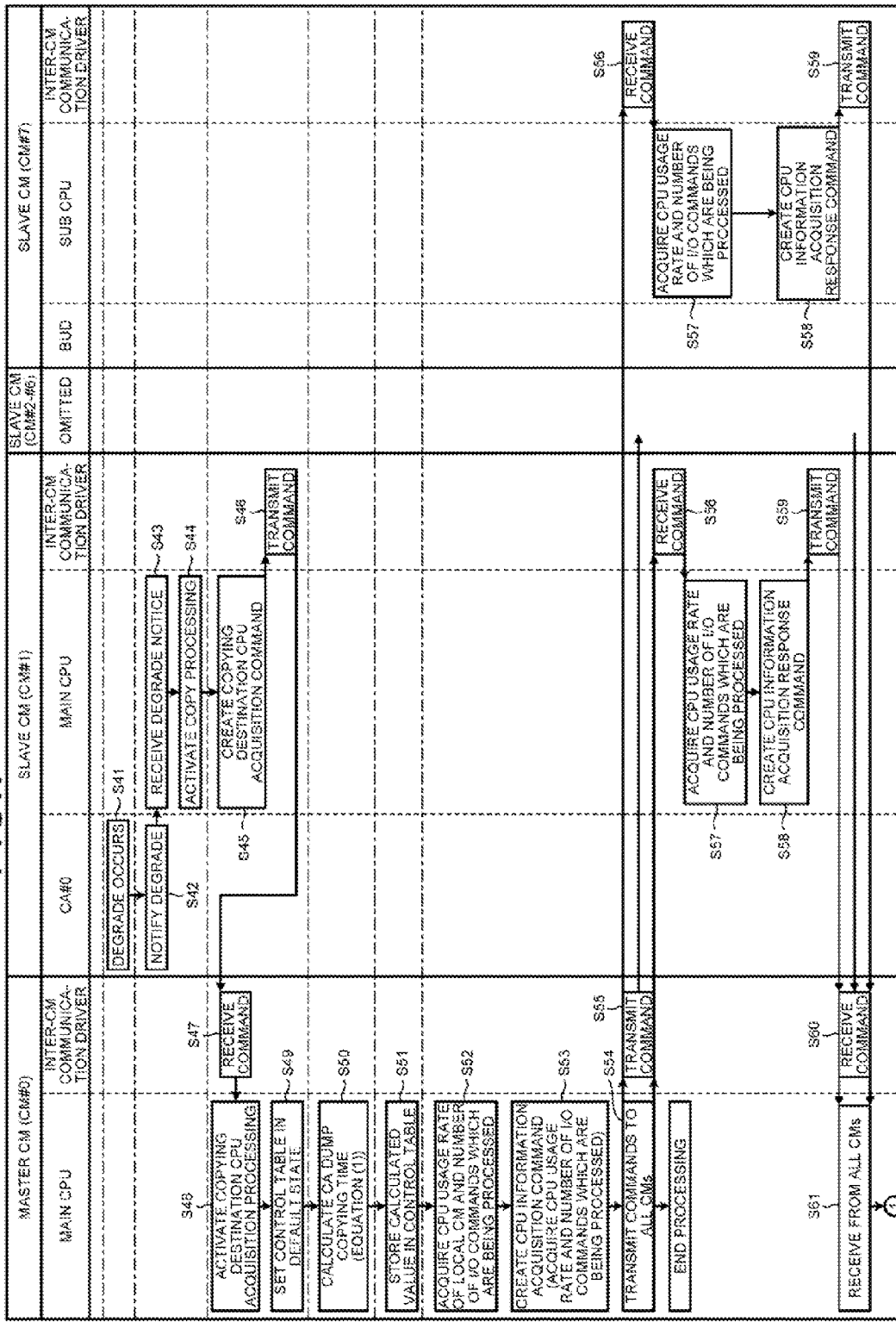

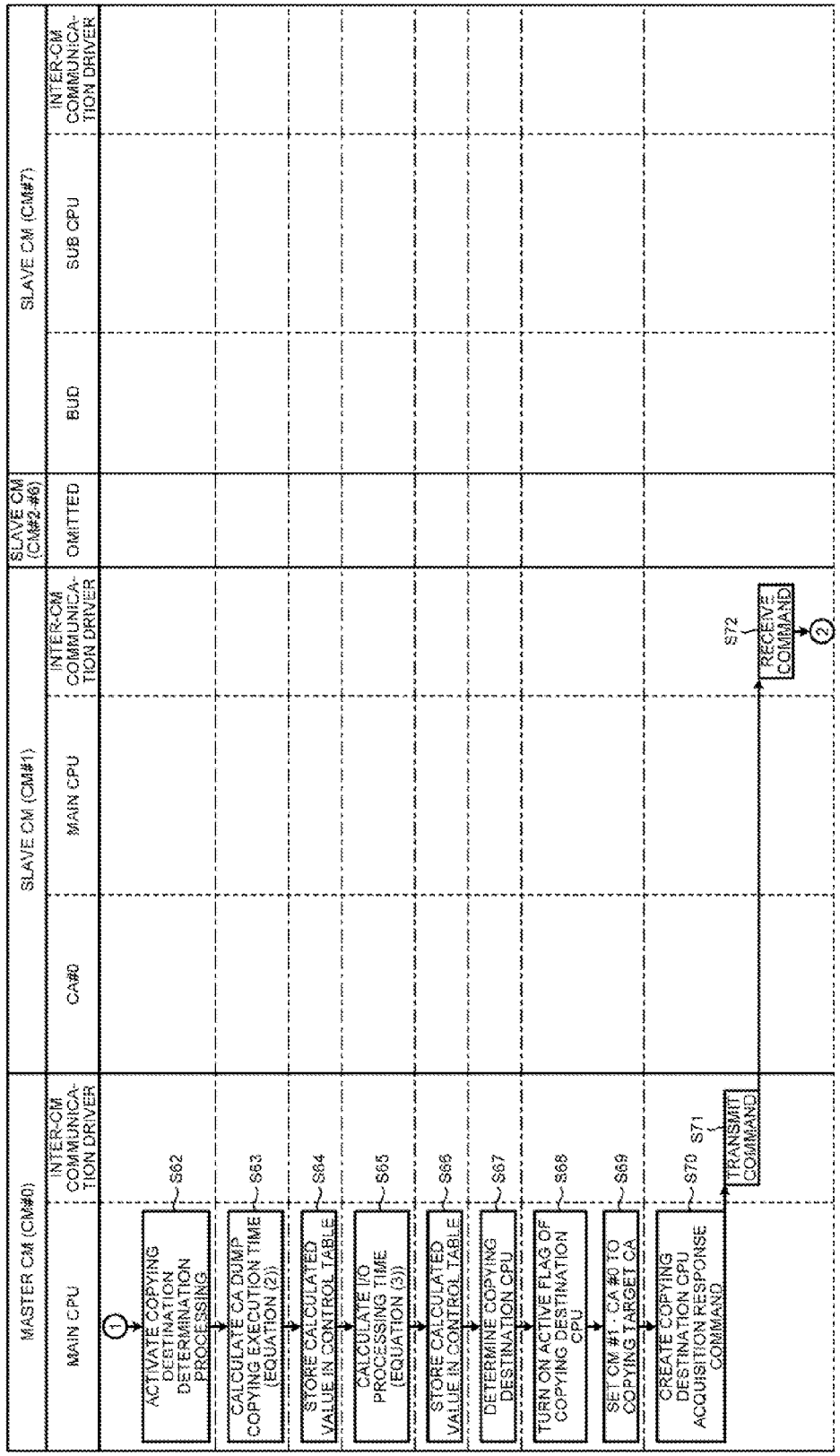

FIG.11

| CPU | ACTIVE FLAG | COPYING TARGET CA | CA DUMP COPYING TIME [SECOND] | CPU USAGE RATE | CA DUMP COPYING EXECUTION TIME [SECOND] | NUMBER OF I/O COMMANDS | I/O PROCESSING TIME [SECOND] |
|---|---|---|---|---|---|---|---|
| CM#0 MAIN CPU | OFF | — | 0 | 0 | 0 | — | 0 |
| CM#0 SUB CPU | OFF | — | 0 | 0 | 0 | — | 0 |
| CM#1 MAIN CPU | OFF | — | 0 | 0 | 0 | — | 0 |
| CM#1 SUB CPU | OFF | — | 0 | 0 | 0 | — | 0 |
| CM#2 MAIN CPU | OFF | — | 0 | 0 | 0 | — | 0 |
| CM#2 SUB CPU | OFF | — | 0 | 0 | 0 | — | 0 |
| CM#3 MAIN CPU | OFF | — | 0 | 0 | 0 | — | 0 |
| CM#3 SUB CPU | OFF | — | 0 | 0 | 0 | — | 0 |
| CM#4 MAIN CPU | OFF | — | 0 | 0 | 0 | — | 0 |
| CM#4 SUB CPU | OFF | — | 0 | 0 | 0 | — | 0 |
| CM#5 MAIN CPU | OFF | — | 0 | 0 | 0 | — | 0 |
| CM#5 SUB CPU | OFF | — | 0 | 0 | 0 | — | 0 |
| CM#6 MAIN CPU | OFF | — | 0 | 0 | 0 | — | 0 |
| CM#6 SUB CPU | OFF | — | 0 | 0 | 0 | — | 0 |
| CM#7 MAIN CPU | OFF | — | 0 | 0 | 0 | — | 0 |
| CM#7 SUB CPU | OFF | — | 0 | 0 | 0 | — | 0 |

FIG.12

| CPU | ACTIVE FLAG | COPYING TARGET CA | CA DUMP COPYING TIME [SECOND] | CPU USAGE RATE | CA DUMP COPYING EXECUTION TIME [SECOND] | NUMBER OF I/O COMMANDS | I/O PROCESSING TIME [SECOND] |
|---|---|---|---|---|---|---|---|
| CM#0 MAIN CPU | OFF | — | 50 | 0 | 0 | — | 0 |
| CM#0 SUB CPU | OFF | — | 50 | 0 | 0 | — | 0 |
| CM#1 MAIN CPU | OFF | — | 45 | 0 | 0 | — | 0 |
| CM#1 SUB CPU | OFF | — | 45 | 0 | 0 | — | 0 |
| CM#2 MAIN CPU | OFF | — | 50 | 0 | 0 | — | 0 |
| CM#2 SUB CPU | OFF | — | 50 | 0 | 0 | — | 0 |
| CM#3 MAIN CPU | OFF | — | 50 | 0 | 0 | — | 0 |
| CM#3 SUB CPU | OFF | — | 50 | 0 | 0 | — | 0 |
| CM#4 MAIN CPU | OFF | — | 50 | 0 | 0 | — | 0 |
| CM#4 SUB CPU | OFF | — | 50 | 0 | 0 | — | 0 |
| CM#5 MAIN CPU | OFF | — | 50 | 0 | 0 | — | 0 |
| CM#5 SUB CPU | OFF | — | 50 | 0 | 0 | — | 0 |
| CM#6 MAIN CPU | OFF | — | 50 | 0 | 0 | — | 0 |
| CM#6 SUB CPU | OFF | — | 50 | 0 | 0 | — | 0 |
| CM#7 MAIN CPU | OFF | — | 50 | 0 | 0 | — | 0 |
| CM#7 SUB CPU | OFF | — | 50 | 0 | 0 | — | 0 |

FIG.14

| CPU | ACTIVE FLAG | COPYING TARGET CA | CA DUMP COPYING TIME [SECOND] | CPU USAGE RATE | CA DUMP COPYING EXECUTION TIME [SECOND] | NUMBER OF I/O COMMANDS | I/O PROCESSING TIME [SECOND] |
|---|---|---|---|---|---|---|---|
| CM#0 MAIN CPU | OFF | — | 50 | 0.8 | 250 | CROSS 100/ STRAIGHT 100 | 2 |
| CM#0 SUB CPU | OFF | — | 50 | 0.8 | 250 | CROSS 120/ STRAIGHT 100 | 2.2 |
| CM#1 MAIN CPU | OFF | — | 45 | 0.2 | 56.3 | CROSS 50/ STRAIGHT 50 | 1 |
| CM#1 SUB CPU | OFF | — | 45 | 0.3 | 64.3 | CROSS 50/ STRAIGHT 50 | 1 |
| CM#2 MAIN CPU | OFF | — | 50 | 0.4 | 83.3 | CROSS 80/ STRAIGHT 70 | 1.5 |
| CM#2 SUB CPU | OFF | — | 50 | 0.1 | 55.6 | CROSS 80/ STRAIGHT 90 | 1.7 |
| CM#3 MAIN CPU | OFF | — | 50 | 0.5 | 100 | CROSS 100/ STRAIGHT 100 | 2 |
| CM#3 SUB CPU | OFF | — | 50 | 0.5 | 100 | CROSS 100/ STRAIGHT 90 | 1.9 |
| CM#4 MAIN CPU | OFF | — | 50 | 0.5 | 100 | CROSS 110/ STRAIGHT 100 | 2.1 |
| CM#4 SUB CPU | OFF | — | 50 | 0.5 | 100 | CROSS 110/ STRAIGHT 110 | 2.2 |
| CM#5 MAIN CPU | OFF | — | 50 | 0.3 | 71.4 | CROSS 100/ STRAIGHT 100 | 2 |
| CM#5 SUB CPU | OFF | — | 50 | 0.2 | 62.5 | CROSS 100/ STRAIGHT 100 | 2 |
| CM#6 MAIN CPU | OFF | — | 50 | 0.5 | 100 | CROSS 40/ STRAIGHT 40 | 0.8 |
| CM#6 SUB CPU | OFF | — | 50 | 0.5 | 100 | CROSS 60/ STRAIGHT 50 | 1.1 |
| CM#7 MAIN CPU | OFF | — | 50 | 0.1 | 55.6 | CROSS 80/ STRAIGHT 80 | 1.6 |
| CM#7 SUB CPU | OFF | — | 50 | 0.1 | 55.6 | CROSS 40/ STRAIGHT 50 | 0.9 |

FIG.15

| CPU | ACTIVE FLAG | COPYING TARGET CA | CA DUMP COPYING TIME [SECOND] | CPU USAGE RATE | CA DUMP COPYING EXECUTION TIME [SECOND] | NUMBER OF I/O COMMANDS | I/O PROCESSING TIME [SECOND] |
|---|---|---|---|---|---|---|---|
| CM#0 MAIN CPU | OFF | — | 50 | 0.8 | 250 | CROSS 100/ STRAIGHT 100 | 2 |
| CM#0 SUB CPU | OFF | — | 50 | 0.8 | 250 | CROSS 120/ STRAIGHT 100 | 2.2 |
| CM#1 MAIN CPU | OFF | — | 45 | 0.2 | 56.3 | CROSS 50/ STRAIGHT 50 | 1 |
| CM#1 SUB CPU | OFF | — | 45 | 0.3 | 64.3 | CROSS 50/ STRAIGHT 50 | 1 |
| CM#2 MAIN CPU | OFF | — | 50 | 0.4 | 83.3 | CROSS 80/ STRAIGHT 70 | 1.5 |
| CM#2 SUB CPU | OFF | — | 50 | 0.1 | 55.6 | CROSS 80/ STRAIGHT 90 | 1.7 |
| CM#3 MAIN CPU | OFF | — | 50 | 0.5 | 100 | CROSS 100/ STRAIGHT 100 | 2 |
| CM#3 SUB CPU | OFF | — | 50 | 0.5 | 100 | CROSS 100/ STRAIGHT 90 | 1.9 |
| CM#4 MAIN CPU | OFF | — | 50 | 0.5 | 100 | CROSS 110/ STRAIGHT 100 | 2.1 |
| CM#4 SUB CPU | OFF | — | 50 | 0.5 | 100 | CROSS 110/ STRAIGHT 110 | 2.2 |
| CM#5 MAIN CPU | OFF | — | 50 | 0.3 | 71.4 | CROSS 100/ STRAIGHT 100 | 2 |
| CM#5 SUB CPU | OFF | — | 50 | 0.2 | 62.5 | CROSS 100/ STRAIGHT 100 | 2 |
| CM#6 MAIN CPU | OFF | — | 50 | 0.5 | 100 | CROSS 40/ STRAIGHT 40 | 0.8 |
| CM#6 SUB CPU | OFF | — | 50 | 0.5 | 100 | CROSS 60/ STRAIGHT 50 | 1.1 |
| CM#7 MAIN CPU | OFF | — | 50 | 0.1 | 55.6 | CROSS 80/ STRAIGHT 80 | 1.6 |
| CM#7 SUB CPU | ON | CM#1-CA#0 | 50 | 0.1 | 55.6 | CROSS 40/ STRAIGHT 50 | 0.9 |

FIG.16

| CPU | ACTIVE FLAG | COPYING TARGET CA | CA DUMP COPYING TIME [SECOND] | CPU USAGE RATE | CA DUMP COPYING EXECUTION TIME [SECOND] | NUMBER OF I/O COMMANDS | I/O PROCESSING TIME [SECOND] |
|---|---|---|---|---|---|---|---|
| CM#0 MAIN CPU | OFF | — | 50 | 0.8 | 250 | CROSS 100/ STRAIGHT 100 | 2 |
| CM#0 SUB CPU | OFF | — | 50 | 0.8 | 250 | CROSS 120/ STRAIGHT 100 | 2.2 |
| CM#1 MAIN CPU | OFF | — | 45 | 0.2 | 56.3 | CROSS 50/ STRAIGHT 50 | 1 |
| CM#1 SUB CPU | OFF | — | 45 | 0.3 | 64.3 | CROSS 50/ STRAIGHT 50 | 1 |
| CM#2 MAIN CPU | OFF | — | 50 | 0.4 | 83.3 | CROSS 80/ STRAIGHT 70 | 1.5 |
| CM#2 SUB CPU | OFF | — | 50 | 0.1 | 55.6 | CROSS 80/ STRAIGHT 90 | 1.7 |
| CM#3 MAIN CPU | OFF | — | 50 | 0.5 | 100 | CROSS 100/ STRAIGHT 100 | 2 |
| CM#3 SUB CPU | OFF | — | 50 | 0.5 | 100 | CROSS 100/ STRAIGHT 90 | 1.9 |
| CM#4 MAIN CPU | OFF | — | 50 | 0.5 | 100 | CROSS 110/ STRAIGHT 100 | 2.1 |
| CM#4 SUB CPU | OFF | — | 50 | 0.5 | 100 | CROSS 110/ STRAIGHT 110 | 2.2 |
| CM#5 MAIN CPU | OFF | — | 50 | 0.3 | 71.4 | CROSS 100/ STRAIGHT 100 | 2 |
| CM#5 SUB CPU | OFF | — | 50 | 0.2 | 62.5 | CROSS 100/ STRAIGHT 100 | 2 |
| CM#6 MAIN CPU | OFF | — | 50 | 0.5 | 100 | CROSS 40/ STRAIGHT 40 | 0.8 |
| CM#6 SUB CPU | OFF | — | 50 | 0.5 | 100 | CROSS 60/ STRAIGHT 50 | 1.1 |
| CM#7 MAIN CPU | OFF | — | 50 | 0.1 | 55.6 | CROSS 80/ STRAIGHT 80 | 1.6 |
| CM#7 SUB CPU | OFF | — | 50 | 0.1 | 55.6 | CROSS 40/ STRAIGHT 50 | 0.9 | ness of the first interface unit while copying dump data of a second interface unit among the plurality of interface units according to abnormality of the second interface unit.

STORAGE SYSTEM, CONTROL DEVICE, AND STORAGE SYSTEM CONTROL METHOD OF CONTROLLING STORAGE SYSTEM

CROSS-REFERENCE TO RELATED APPLICATION

This application is based upon and claims the benefit of priority of the prior Japanese Patent Application No. 2011-277332, filed on Dec. 19, 2011, the entire contents of which are incorporated herein by reference.

FIELD

The embodiments discussed herein are directed to, for example, a storage system.

BACKGROUND

In a storage system, a controller module (CM) controls data with respect to a plurality of disk devices. Further, the CM uses a channel adapter (CA) to receive an input/output command with respect to the disk device from a host computer, and controls the received input/output command. Furthermore, a plurality of CAs is usually mounted on this CM.

Some CAs have a dumping function of recording internal files and content of a memory. When failure occurs in a CA having such a dumping function, a CPU (Central Processing Unit) in the CM copies dump data in order to analyze the failure of CA in which the failure has occurred, and stores the copied data in a system disk in a system. Then, the CA in which the failure occurs is separated. Further, even when there are a main CPU and a sub CPU in a CM, the main CPU copies dump data of the CA in which the failure has occurred, at all times.

Patent Literature 1: Japanese Laid-open Patent Publication No. 09-160884

Patent Literature 2: Japanese Laid-open Patent Publication No. 11-338838

However, when failure occurs in a plurality of CAs at the same period in one CM, there is a problem that it is not possible to dump data of all CAs in which the failure has occurred, within a specified time. Meanwhile, the same period refers to a period in which failure that copying periods of dump data of two CAs overlap occurs. For example, it is assumed that failure occurs in two CAs at the same period in one CM. In this case, even when there are two main and sub CPUs in a CM, the main CPU serially copies dump data of two CAs in which failure has occurred at all times, and therefore is not capable of copying the dump data in a specified time.

SUMMARY

According to an aspect of an embodiment, a storage system includes a memory device that stores data and a control device that controls an input and an output of data to and from the memory device. The control device includes a first processing unit and a second processing unit that distribute and execute processing in the control device. Further the control device includes a plurality of interface units that receive commands related to the input and the output of the data stored in the memory device from an external device. And the first processing unit requests the second processing unit to copy dump data of a first interface unit among the plurality of interface units when detecting abnormality of the first interface unit while copying dump data of a second interface unit among the plurality of interface units according to abnormality of the second interface unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a functional block diagram illustrating a configuration of a storage system according to a third embodiment;

FIG. 4 is a view illustrating an example of a data structure of a copying control table according to the third embodiment;

FIG. 5 is a view illustrating a flowchart of CA dump copy processing according to the third embodiment;

FIG. 7 is a sequence diagram (1) of CA dump copy processing according to the third embodiment;

FIG. 8 is a sequence diagram (2) of the CA dump copy processing according to the third embodiment;

FIG. 11 is a view illustrating a specific example of a copying control table which is initialized in S49;

FIG. 12 is a view illustrating a specific example of a copying control table in which CA dump copying times are stored in S51;

FIG. 14 is a view illustrating a specific example of a copying control table in which I/O processing times are stored in S66;

FIG. 15 is a view illustrating a specific example of a copying control table in which copying destination CPUs are reflected in S68 and S69; and FIG. 16 is a view illustrating a specific example of a copying control table in which active flags are updated in S112 after copying is completed.

DESCRIPTION OF EMBODIMENTS

Preferred embodiments of the present invention will be explained with reference to accompanying drawings. In addition, these embodiments by no means limit the present invention.

[a] First Embodiment

Configuration of Storage System According to First Embodiment

Figure 1:
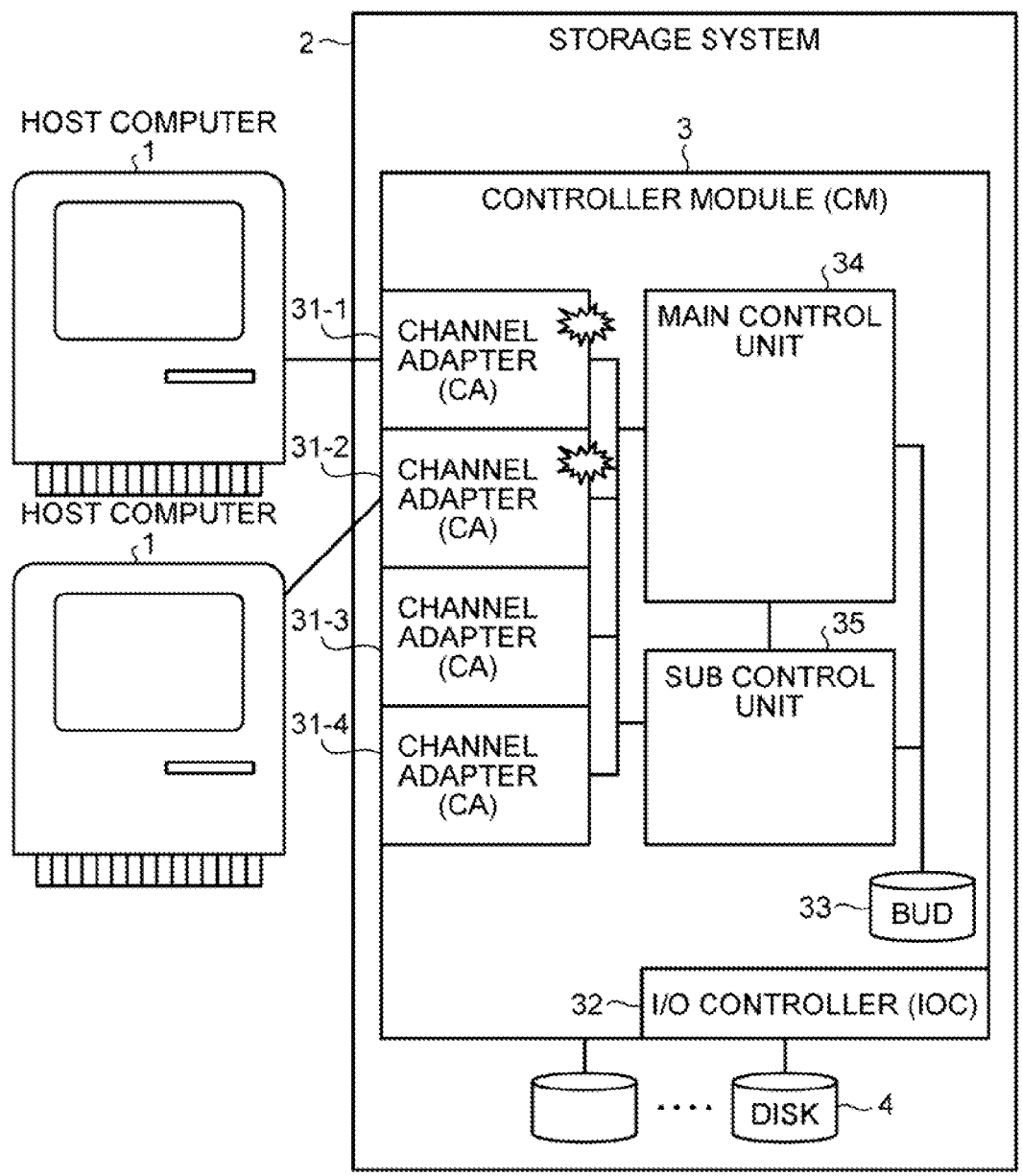
FIG. 1 is a functional block diagram illustrating a configuration of a storage system according to a first embodiment.

FIG. 1 is a functional block diagram illustrating a configuration of a storage system according to a first embodiment. As illustrated in FIG. 1, a storage system 2 connects to host computers 1 which are higher layer devices. Further, the storage system 2 has a controller module (CM) 3 and a plurality of disk devices (hereinafter, referred to as "disks") 4.

The controller module (CM) 3 is a device which controls an input and an output of data to and from the disks 4. Further, the controller module (CM) 3 has a plurality of channel adapters (CA) 31, an I/O controller (IOC) 32, a BUD 33, a main control unit 34 and a sub control unit 35.

The disk 4 is a memory device which stores data, and supports, for example, an HDD (Hard Disk Drive) and an SSD (Solid State Drive).

The channel adapter 31 is a communication interface which establishes communication connection with the host computer 1. For example, the channel adapter 31 receives a command (input/output command) related to an input and an output of data stored in the disk 4 from the host computer 1. More than one channel adapter 31 is in the controller module 3, and, in the first embodiment, there are four channel adapters 31. These channel adapters 31 have the dumping functions. That is, even when failure occurs in the channel adapter 31 and this channel adapter 31 is separated, dump data held in the channel adapter 31 is copied and is stored in the BDD 33 in the storage system 2. The dump data stored in the BUD 33 is used to analyze the failure in the channel adapter 31 in which the failure has occurred. In addition, processing of performing separation when failure occurs is referred to as "degrade processing".

The I/O controller (IOC) 32 is a communication interface which establishes communication connection with the disks 4. The BUD (Bootup and Utility Device) 33 is a memory device which stores dump data copied from the channel adapters 31.

The main control unit 34 is a main control unit for dispersing and executing processing in the local controller module 3. The sub control unit 35 is a sub control unit for dispersing and executing processing in the local controller module 3. In addition, the main control unit 34 and the sub control unit 35 are integrated circuits such as ASICs (Application Specific Integrated Circuit) or FPGAs (Field Programmable Gate Array), or electronic circuits such as CPUs (Central Processing Unit) or MPUs (Micro Processing Unit). Further, each functioning unit included in the main control unit 34 and the sub control unit 35 is respectively realized by, for example, CFW (Controller Module Firmware) which controls the controller module 3.

The main control unit 34 executes processing of copying dump data of the channel adapter 31 according to abnormality of one channel adapter 31 of a plurality of channel adapters 31. Further, the main control unit 34 detects abnormality of another channel adapter 31 while executing processing of copying the dump data of one channel adapter 31. Furthermore, the main control unit 34 requests the sub control unit 35 to rip the dump data of another channel adapter 31 from which abnormality has been detected. The copy processing is executed by, for example, acquiring the dump data of the channel adapter 31 which is copied, onto a memory (not illustrated), compressing the acquired dump data and storing the dump data in the BUD 33.

Thus, with the storage system 2, the main control unit 34 detects abnormality of another channel adapter 31 in some cases while copying the dump data of one channel adapter 31. In this case, the main control unit 34 requests the sub control unit 35 to copy the dump data of the channel adapter 31 from which abnormality has been detected. Consequently, the storage system 2 can copy dump data of the two channel adapters 31 in which abnormality has occurred, in parallel, so that it is possible to copy the dump data of both of the channel adapters 31 within a specified time.

[b] Second Embodiment

By the way, in the storage system 2 according to the first embodiment, abnormality occurs in still another channel adapter (CA) 31 in the same controller module (CM) 3 in some cases. That is, abnormality previously occurs in two CAs 31 in one CM 3, and abnormality occurs in still another CA 31 in some cases. In these cases, when a main control unit 34 and a sub control unit 35 copy dump data of the CA 31 in which abnormality has previously occurred, it is not possible to copy dump data of the CA 31 in which abnormality further has occurred, within a specified time in some cases. Meanwhile, the main control unit 34 or the sub control unit 35 can also doubly execute processing of copying dump data of the CA 31 in which abnormality has further occurred, and the processing which is being previously executed. However, processing of copying dump data of the CA 31 faces strict time restriction in some cases. This is because a request for stopping an operation of the CA 31 in which abnormality has occurred at an early stage is made. Hence, a case will be described with the second embodiment where, when abnormality occurs in still another CA 31, a control unit outside the CM 3 is requested to copy dump data of the CA 31 in which abnormality has further has occurred.

Configuration of Storage System According to Second Embodiment

Figure 2:
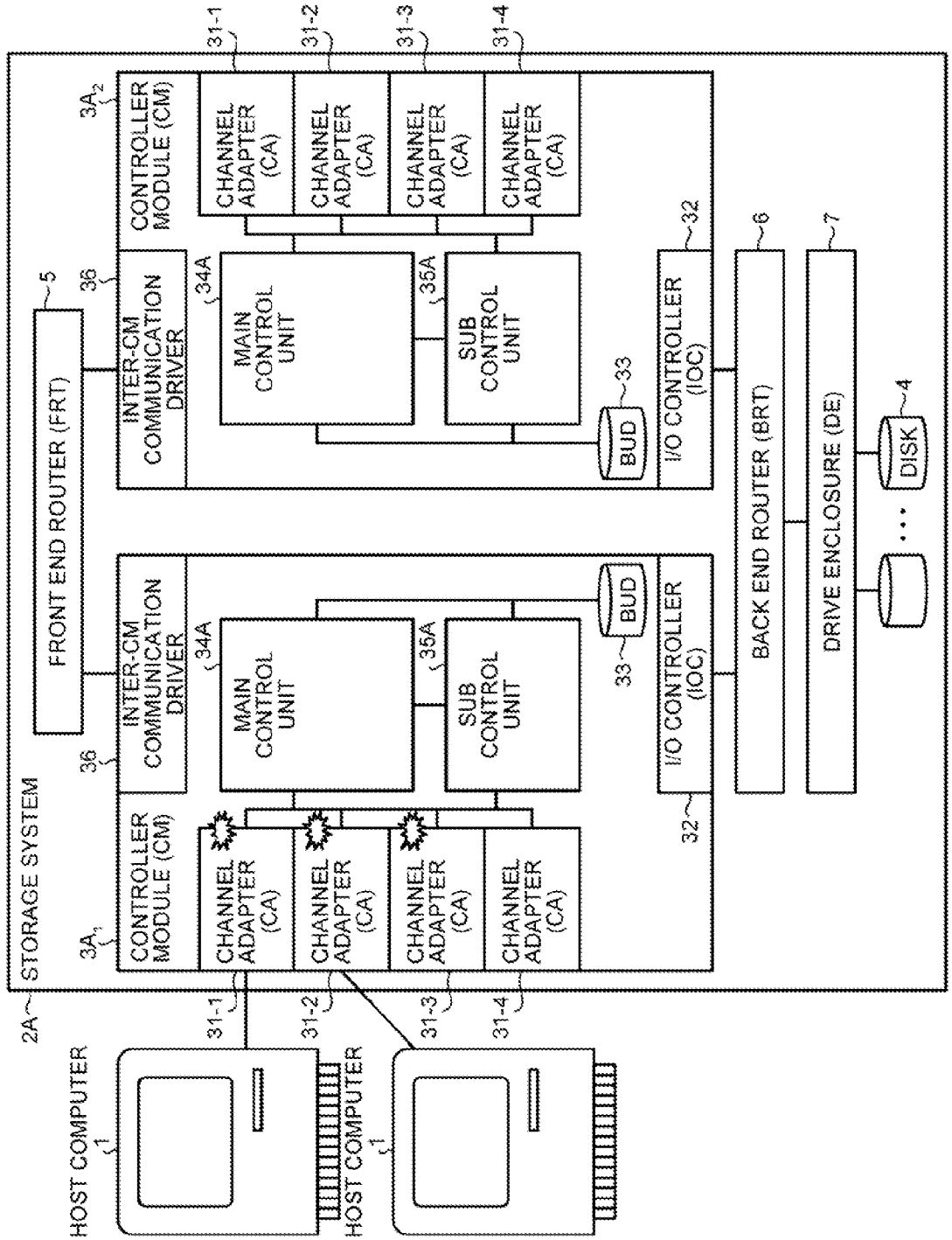
FIG. 2 is a functional block diagram illustrating a configuration of a storage system according to a second embodiment.

FIG. 2 is a functional block diagram illustrating a configuration of a storage system according to the second embodiment. In addition, the same configurations as in the storage system 2 illustrated in FIG. 1 will be assigned the same reference numerals, and overlapping configurations and operations thereof will not be described. The difference between the first embodiment and the second embodiment is that a controller module $3A_1$ and a controller module $3A_2$ are duplexed. Further, the difference between the first embodiment and the second embodiment is that an inter-CM communication driver 36 is added to the controller modules $3A_1$ and $3A_2$. Furthermore, the difference between the first embodiment and the second embodiment is that a front end router 5, a back end router 6 and a drive enclosure 7 are added.

The front end router (FRT) 5 connects between controller modules 3A. The back end router (BRT) 6 connects between the controller modules 3A and a disk 4. The drive enclosure (DE) 7 is a housing on which the disk 4 is mounted.

The inter-CM communication driver 36 is a communication interface which establishes communication connection with another controller module 3A through the front end router 5.

A main control unit 34A executes processing of copying dump data of a channel adapter 31 according to abnormality of one channel adapter 31 of a plurality of channel adapters 31. Further, the main control unit 34A detects abnormality of another channel adapter 31 while executing processing of copying the dump data of one channel adapter 31. Furthermore, the main control unit 34A requests a sub control unit 35A to copy the dump data of another channel adapter 31 from which abnormality has been detected. Meanwhile, when detecting abnormality of still another channel adapter 31, the main control unit 34A requests a control unit of the external controller module 3A to copy dump data of the channel adapter 31 from which abnormality has been further detected.

For example, the main control unit 34A executes processing of copying dump data of a channel adapter 31-1 according to abnormality of the channel adapter 31-1. In this case, when detecting abnormality of another channel adapter 31-2, the main control unit 34A requests the sub control unit 35A to copy dump data of the channel adapter 31-2 from which abnormality has been detected. The main control unit 34A and the sub control unit 35A execute processing of copying dump data of the channel adapters 31-1 and 31-2, respectively. Meanwhile, when detecting abnormality of still another channel adapter 31-3, the main control unit 34A requests a control unit of the controller module $3A_2$ through the inter-CM communication driver 36 to copy dump data of the channel adapter 31-3 from which abnormality has been detected.

The main control unit 34A or the sub control unit 35A of the controller module $3A_2$ executes processing of copying the dump data of the channel adapter 31-3 from which abnormality has been detected. The copy processing is executed as follows. For example, the main control unit 34A of the controller module $3A_1$ acquires the dump data of the channel adapter 31-3, onto a memory (not illustrated). Further, the main control unit 34A transmits the acquired dump data to a control unit which is requested to copy the controller module $3A_2$ through the inter-CM communication driver 36. Furthermore, the control unit which is requested to perform copying acquires the transmitted dump data, compresses the acquired dump data and stores the compressed data in a BUD 33 of the controller module $3A_2$. In addition, an issue is to which one of the main control unit 34A and the sub control unit 35A of the controller module $3A_2$ a request is made. For example, the main control unit 34A may determine through inter-CM communication a control unit of a small processing load among control units of the controller module $3A_2$ as a control unit which is requested to perform copying. Further, the main control unit 34A requests through inter-CM communication the determined control unit to perform copying.

Thus, with a storage system 2A, while executing processing of copying dump data of the channel adapters 31, respectively, the main control unit 34A and the sub control unit 35A detect abnormality of still another channel adapter 31. In this case, the storage system 2A requests the control unit of the external controller module $3A_2$ to copy dump data of the channel adapter 31 from which abnormality has been further detected. Hence, the storage system 2 can copy dump data of the three channel adapters 31 in which abnormality has been detected, in parallel, so that it is possible to copy dump data of all channel adapters 31 in which abnormality has occurred, within a specified time.

[c] Third Embodiment

By the way, in some cases, a main control unit 34A has a plurality of control units of a controller module (CM) 3A which makes a request to an outside. In these cases, the main control unit 34A may request an optimal control unit outside the CM 3A to copy dump data of a channel adapter (CA) 31 in which abnormality has further occurred. Hence, a case will be described with the third embodiment where, when abnormality occurs in still another CA 31, an optimal control unit outside the CM 3A to copy dump data of the CA 31 in which abnormality has further occurred. Meanwhile, the optimal control unit is an example of a control unit of the shortest processing time of input/output processing which is being processed.

Configuration of Storage System According to Third Embodiment

FIG. 3 is a functional block diagram illustrating a configuration of a storage system according to the third embodiment. In addition, the same configurations as in a storage system 2 illustrated in FIG. 1 will be assigned the same reference numerals, and overlapping configurations and operations will not be described. The difference between the first embodiment and the third embodiment is that a controller module $3B_0$ is made redundant as n−1 (n is an integer equal to or more than 3) controller modules 3B. Meanwhile, the controller module $3B_0$ is a master CM, and other controller modules $3B_1$ to $3B_{n-1}$ are slave CMs. Further, a case will be described where, in the controller module $3B_1$, abnormality occurs in two channel adapters 31, and then abnormality occurs in still another channel adapter 31.

Furthermore, the difference between the first embodiment and the third embodiment is that inter-CM communication drivers 36 are added to the controller modules $3B_0$ to $3B_{n-1}$, respectively. Still further, the difference between the first embodiment and the third embodiment is that a front end router 5, a back end router 6 and a drive enclosure 7 are added. Moreover, the difference between the first embodiment and the third embodiment is that a memory unit 37 is added to each controller module 3B, and CPU usage rate information 372 and command count information 373 are added to the memory unit 37. Further, the difference is also that a copying control table 371 is added to the memory unit 37 of the controller module (master CM) $3B_0$. Furthermore, the difference between the first embodiment and the third embodiment is that an information acquiring unit 53 is added to a main control unit 34B of each controller module 3B. Still further, the difference is that a copying destination determining unit 52 is further added to the main control unit 34B of the master CM $3B_0$, and a copy processing unit 51 is added to the main control unit 34B of the CM $3B_1$ in which abnormality occurs. In addition, although the CM in which abnormality occurs is not limited to CM $3B_1$ and therefore it is desirable to add the copying destination determining unit 52 to the main control units 34B of all CMs, the copying destination determining unit 52 is added to the main control unit 34B of the CM $3B_1$ in which abnormality occurs for the sake of ease of description.

Further, the front end router 5, the back end router 6 and the drive enclosure 7 have been described together with a storage system 2A in FIG. 2, and the description thereof will be omitted. Furthermore, the third embodiment will be described assuming that, although the main control unit 34B and a sub control unit 35A are not limited to CPUs, the main control unit 34B is assumed to be a main CPU and the sub control unit 35A is assumed to be a sub CPU for the sake of ease of description. Still further, with the third embodiment, a controller module will be abbreviated as "CM", and a channel adapter will be abbreviated as "CA".

The memory unit 37 corresponds to a memory device of a semiconductor memory element such as an RAM (Random Access Memory) or a flash memory. The copying control table 371 associates and stores per control unit a predicted time spent for copy processing and a processing time converted from the number of input/output commands which are being processed. This copying control table 371 is created by, for example, the copying destination determining unit 52 and is used to determine a copying destination. The CPU usage rate information 372 is directed to managing information including the usage rate of each control unit in a local CM. The command count information 373 is directed to managing information including the number of input/output commands which are being processed in each control unit of a local CM. In addition, details of the copying control table 371 will be described below.

The copy processing unit 51 executes processing of copying dump data of the CA 31 according to abnormality of the CA 31. Further, when detecting abnormality of another CA 31 while executing processing of copying dump data of one CA 31, the copy processing unit 51 requests the sub control unit 35A to copy dump data of another CA 31 from which abnormality has been detected. Meanwhile, when detecting abnormality of still another CA 31, the copy processing unit 51 has the master CM $3B_0$ determine a copying destination of dump data of the CA 31 from which abnormality has been further detected. For example, the copy processing unit 51 transmits to the master CM $3B_0$ a request for acquiring the copying destination through the inter-CM communication driver 36. In this case, the copy processing unit 51 transfers the size of dump data to the master CM $3B_0$. Further, the copy processing unit 51 requests the copying destination determined by the master CM $3B_0$ to copy dump data of the CA 31 from which abnormality has been detected.

When there is a plurality of copying destination candidates which request copying of dump data to an outside, the copying destination determining unit 52 narrows down copying destination candidates to control units of shorter copying times of dump data of the CA 31 from which abnormality has been detected than a predetermined specified time. Further, the copying destination determining unit 52 determines a control unit of the shortest processing time converted from the number of input/output commands which are being processed as the copying destination from the copying destination candidates which are narrowed down. That is, the copying destination determining unit 52 predicts whether or not it is possible to reliably copy dump data within the predetermined specified time, and determine the control unit of the shortest input/output processing time as the copying destination from the copying destination candidates from which dump data is predicted to be copied.

Processing of the copying destination determining unit 52 of predicting whether or not it is possible to reliably copy dump data within the predetermined specified time will be described. For example, the copying destination determining unit 52 calculates a predicted time (CA dump copying time) spent for processing of each control unit of copying dump data from the size of dump data of a CA, and stores the calculated predicted time in the copying control table 371. The copying destination determining unit 52 calculates the CA dump copying time based on following equation (1).

$$\text{CA dump copying time} = \{(\text{inter-CM/CA communication time}) + (\text{inter-CM/CM communication time}) + (\text{data compressing time}) + (\text{BUD storing time})\} \times (\text{data size}) \quad (1)$$

Meanwhile, a data size refers to a data size of dump data of a CA in which abnormality has occurred. The inter-CM/CA communication time refers to a communication time when data of 1 megabytes (MB: MBytes) is transmitted between a CA in which abnormality has occurred and a CM which has this CA. The inter-CM/CM communication time refers to a communication time when 1 MB data is transmitted from the CM which has the CA in which abnormality has occurred, to the copying destination CM, and is used when the copying destination is outside the CM which has the CA in which abnormality has occurred. The data compressing time refers to a time spent to compress 1 MB data. The BUD storage time refers to a time spent to store compressed 1 MB data.

Further, the copying destination determining unit 52 acquires the usage rate of each control unit (the usage rate of each CPU) from the CPU usage rate information 372 of each CM. Furthermore, the copying destination determining unit 52 calculates a predicted time (CA dump copying execution time) spent for processing of copying dump data corresponding to the usage rate of each control unit (the usage rate of each CPU) using the calculated CA dump copying time of each control unit. The copying destination determining unit 52 calculates the CA dump copying execution time based on following equation (2).

$$\text{CA dump copying execution time} = (\text{CA dump copying time}) \div \{1 - \text{usage rate of CPU}\} \quad (2)$$

Further, the copying destination determining unit 52 stores the calculated CA dump copying execution time of each control unit, in the copying control table 371. Furthermore, the copying destination determining unit 52 compares the CA dump copying execution time of each control unit stored in the copying control table 371 and a specified time which is allowed for copying, and narrows down copying destination candidates which can complete copying within the specified time.

Next, processing of determining a control unit of the shortest input/output processing time among copying destination candidates which, the copying destination determining unit 52 predicts, can be copied will be described. For example, the copying destination determining unit 52 acquires the number of input/output commands which are being processed by each control unit, from the command count information 373 of each CM. Further, the copying destination determining unit 52 calculates a processing time (I/O processing time) of each control unit converted from the acquired number of input/output commands of each control unit. The copying destination determining unit 52 calculates the I/O processing time of each control unit based on following equation (3) from the numbers of input/output commands of a straight access without using inter-CM communication and a cross access using inter-CM communication.

$$\text{I/O processing time} = (\text{number of input/output commands of cross access}) \times (\text{input/output command processing time of cross access}) + (\text{number of input/output commands of straight access}) \times (\text{input/output command processing time of straight access}) \quad (3)$$

Meanwhile, the number of input/output commands of cross access refers to the number of input/output commands which are being processed in a cross access. The number of input/output commands of a cross access includes not only the number of input/output commands transmitted through inter-CM communication but also the number of input/output commands received through inter-CM communication. The processing time of an input/output command of a cross access refers to a processing time for processing one input/output command of a cross access. The number of input/output commands of a straight access refers to the number of input/output commands which are being processed for a straight access. The processing time of the input/output command of straight access refers to a processing time for processing one input/output command of a straight access.

Further, the copying destination determining unit 52 stores the calculated I/O processing time of each control unit in the copying control table 371. Furthermore, the copying destination determining unit 52 determines as a copying destination the control unit of the shortest I/O processing time of each control unit stored in the copying control table 371 among copying destination candidates which have been previously narrowed down. Still further, the copying destination determining unit 52 notifies the determined copying destination to a CM of a request source. As a result, the CM of the request source can request the determined copying destination to copy dump data of the CA 31 from which abnormality has been detected.

In addition, in some cases, the copying destination determining unit 52 does not have even one control unit of a shorter copying time of dump data of the CA 31 from which abnormality has been detected than the specified time which is allowed for copying. In this case, the copying destination determining unit 52 may determine the control unit of the shortest I/O processing time as the copying destination. By this means, the copying destination determining unit 52 can have the determined copying destination keep copying dump data by the specified time which is allowed for copying, and check abnormality using the copied dump data.

Data Structure of Copying Control Table

Next, a data structure of the copying control table 371 will be described with reference to FIG. 4. FIG. 4 is a view illustrating an example of a data structure of the copying control table according to the third embodiment. As illustrated in FIG. 4, the copying control table 371 associates a CPU 371a with an active flag 371b, a copying target CA 371c, a CA dump copying time 371d, a CPU usage rate 371e and a CA dump copying execution time 371f to store. Further, the copying control table 371 associates the CPU 371a with a number of I/O commands 371g and an I/O processing time 371h to store.

The CPU 371a refers to a CPU which supports each control unit when a control unit is a CPU. The active flag 371b refers to a flag which indicates whether or not copy processing is being executed. For example, "ON" is set when the copy processing is being executed, and "OFF" is set when the copy processing is not being executed. The copying target CA 371c refers to a copying target CA when the copy processing is being executed. The CA dump copying time 371d refers to a predicted time spent for processing of each CPU of copying dump data from the size of dump data of a CA, and is calculated according to above described equation (1). The CPU usage rate 371e refers to the usage rate of each CPU. The CA dump copying execution time 371f refers to the predicted time for executing copy processing supporting the usage rate of each CPU, and is calculated according to above described equation (2). The number of I/O commands 371g refers to the number of input/output commands which are being processed by each CPU. For example, the numbers of input/output commands of a cross access and a straight access are set. The I/O processing time 371h refers to a processing time of each CPU converted from the number of I/O commands, and is calculated according to above described equation (3).

For example, when the CPU 371a is "main CPU of CM #0", the copying control table 371 stores "OFF" as the active flag 371b, "–" as the copying target CA 371c and "50" seconds as the CA dump copying time 371d. Further, the copying control table 371 stores "0.8" as the CPU usage rate 371e, "250" seconds as the CA dump copying execution time 371f, "cross 100/straight 100" as the number of I/O commands 371g and "2" seconds as the I/O processing time 371h. Furthermore, when the CPU 371a is "sub CPU of CM #7", the copying control table 371 stores "CM #1-CA #0" as the copying target CA 371c. That is, with an example of FIG. 4, the sub CPU of CM #7 copies dump data of CM #0.

Procedure of CA Dump Copy Processing

Next, a procedure of CA dump copy processing of the copy processing unit 51 will be described with reference to FIG. 5. FIG. 5 is a view illustrating a flowchart of CA dump copy processing according to the third embodiment. In addition, the main control unit 34B and the sub control unit 35A of CM #m are executing processing of copying dump data of CA #m1 and CA #m2 in which abnormality has occurred. Further, abnormality of CA #m0 has occurred in CA #m, and CA #m0 in which abnormality has occurred starts being degraded.

Then, the copy processing unit 51 of the main control unit 34B (main CPU) in CM #m acquires a request for copying dump data of CM #m0 in which abnormality has occurred, from a system control (step S11). Meanwhile, the system control is a functioning unit which controls a system and is included in, for example, a CM. Further, the copy processing unit 51 acquires the size of dump data from CA #m0 in which abnormality has occurred (step S12).

Subsequently, the copy processing unit 51 has the master CM determine the copying destination of dump data of CA #m0, and acquires a copying destination CPU from the master CM (step S13). The main control unit 34B and the sub control unit 35A are executing processing of copying dump data of each CA in which abnormality has already occurred previously. For example, the copy processing unit 51 creates a command (copying destination CPU acquisition command) of acquiring a copying destination CPU including the size of the dump data of CA #m0, and transmits the created command to the master CM. In addition, a detailed procedure of copying destination determination processing of the master CM will be described below.

Further, the copy processing unit 51 requests the acquired copying destination CPU to perform processing of copying the dump data of CA #m0 (step S14). For example, the copy processing unit 51 creates a command (CA dump storage request command) of requesting for storing CA dump, and transmitting the created command to the copying destination CPU.

Subsequently, the copy processing unit 51 acquires dump data from CA #m0 in which abnormality has occurred through inter-CM/CA communication (step S15). Further, the copy processing unit 51 transfers the acquired dump data to the copying destination CPU thorough inter-CM/CM communication (step S16). Furthermore, the copy processing unit 51 waits for a storage completion notice from the copying destination CPU indicating that storage of dump data is completed (step S17).

Still further, the copy processing unit 51 determines whether or not transfer of all items of dump data is completed (step S18). When determining that transfer of all items of dump data is not completed (No in step S18), the copy processing unit 51 proceeds to step S15 to transfer the rest of dump data.

Meanwhile, when determining that transfer of all items of dump data is completed (Yes in step S18), the copy processing unit 51 notifies to the master CM that copying of dump data of CA #m0 in which abnormality has occurred is completed (step S19). By this means, the copy processing unit 51 finishes CA dump copy processing, and finishes degrade processing.

Procedure of Copying Destination Determination Processing

Figure 6A:
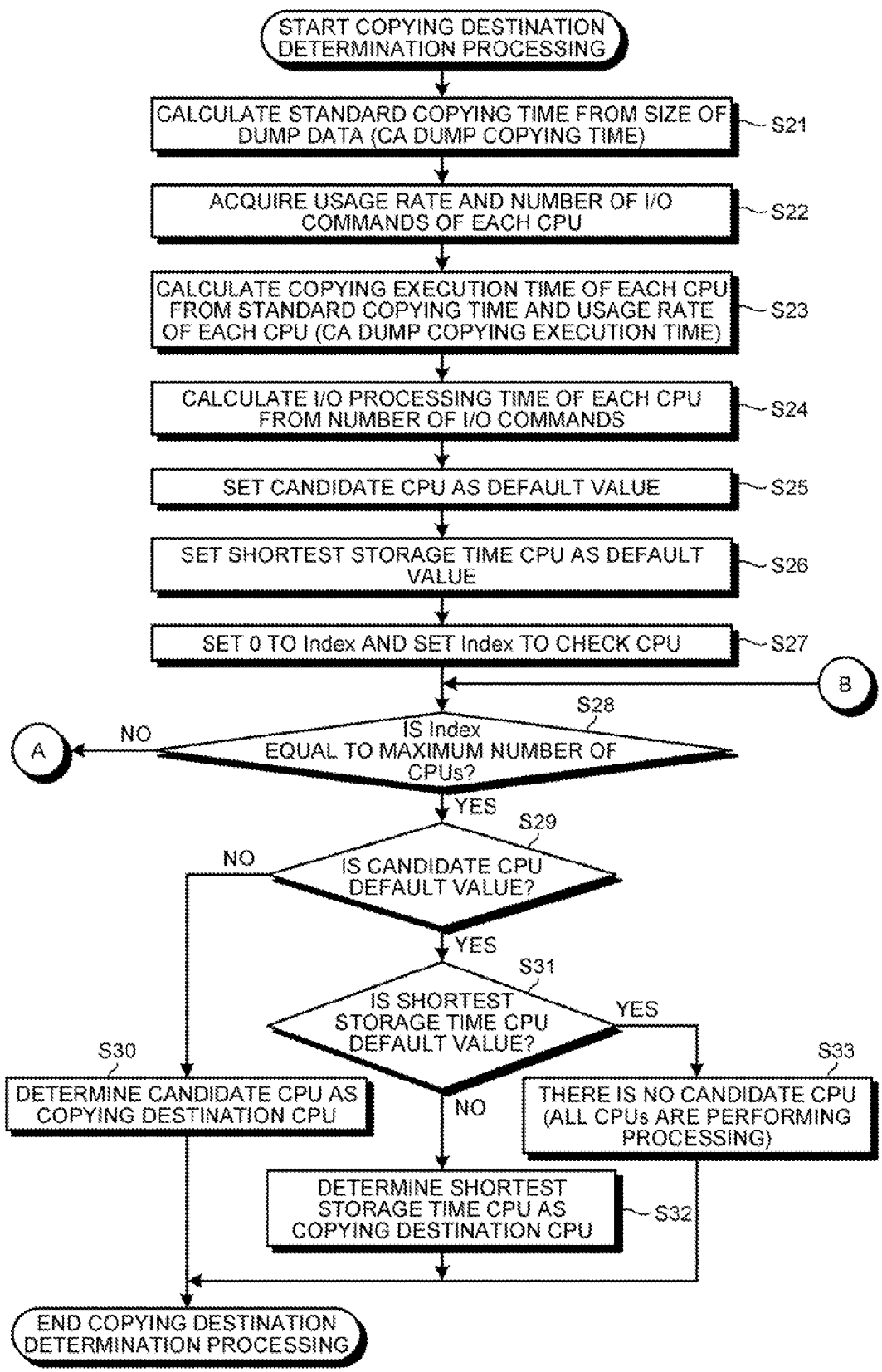
FIG. 6A is a view (1) illustrating a flowchart of copying destination determination processing according to the third embodiment.
Figure 6B:
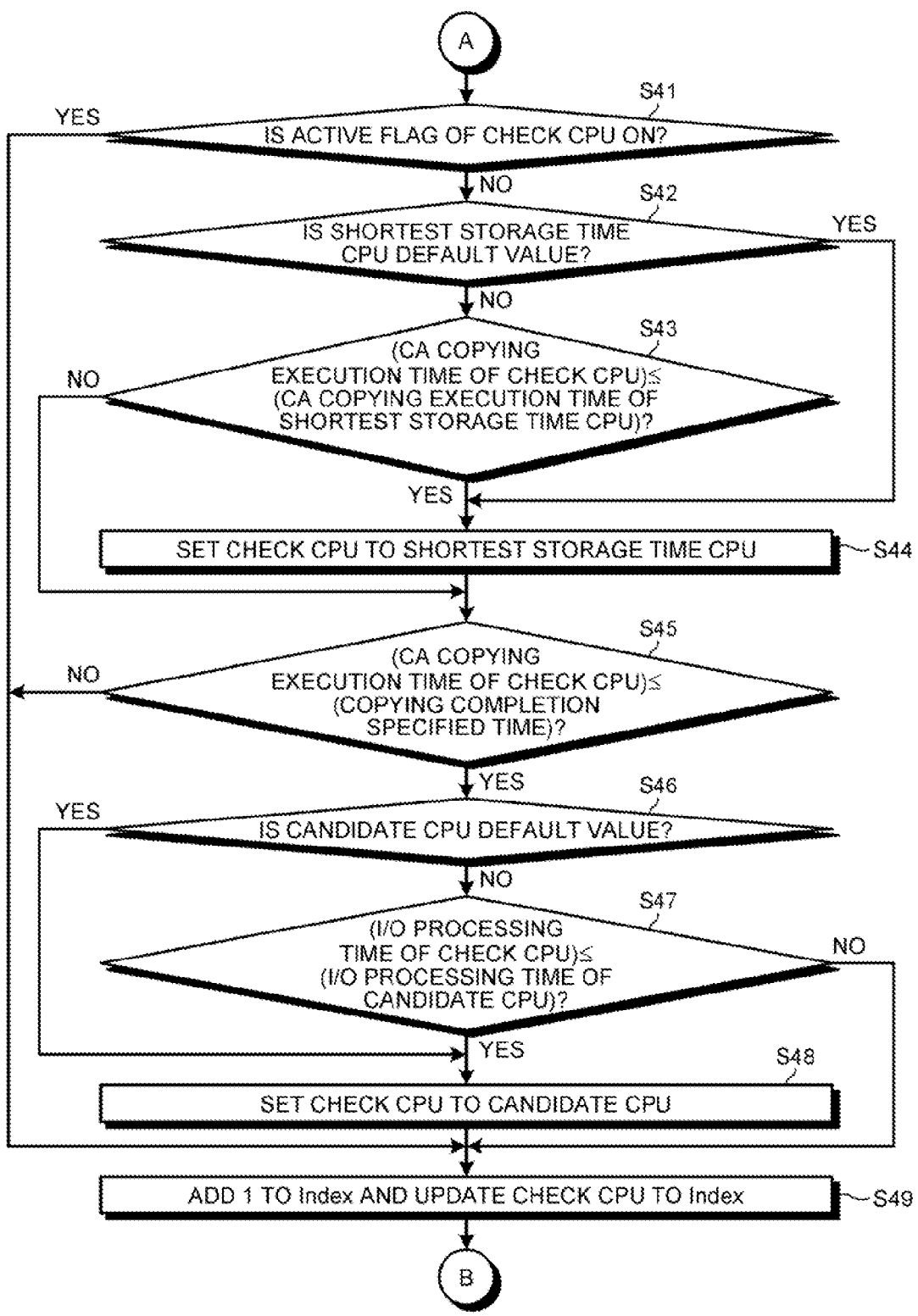
FIG. 6B is a view (2) illustrating a flowchart of copying destination determination processing according to the third embodiment.
Figure 9:
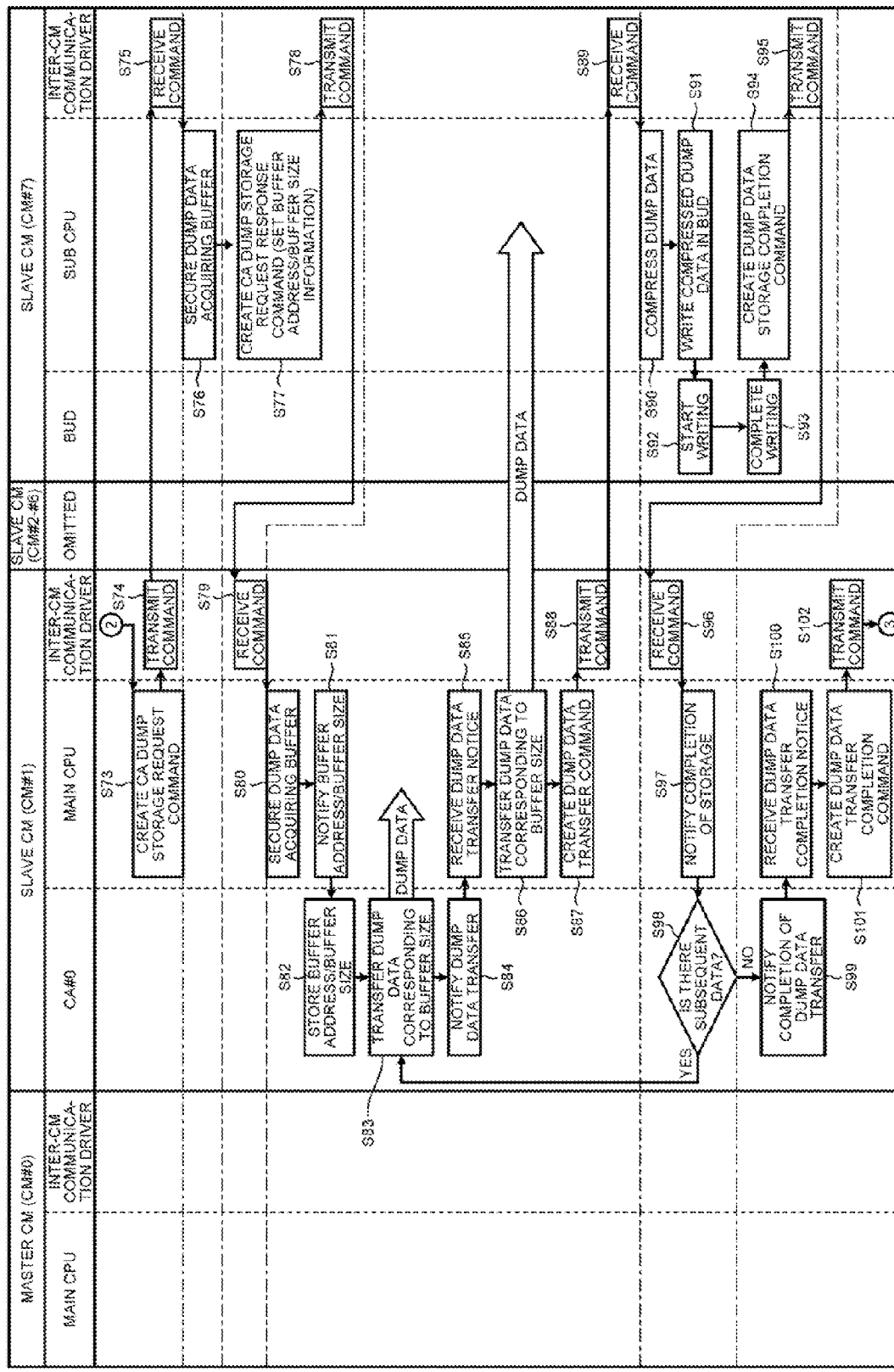
FIG. 9 is a sequence diagram (3) of the CA dump copy processing according to the third embodiment.
Figure 10:
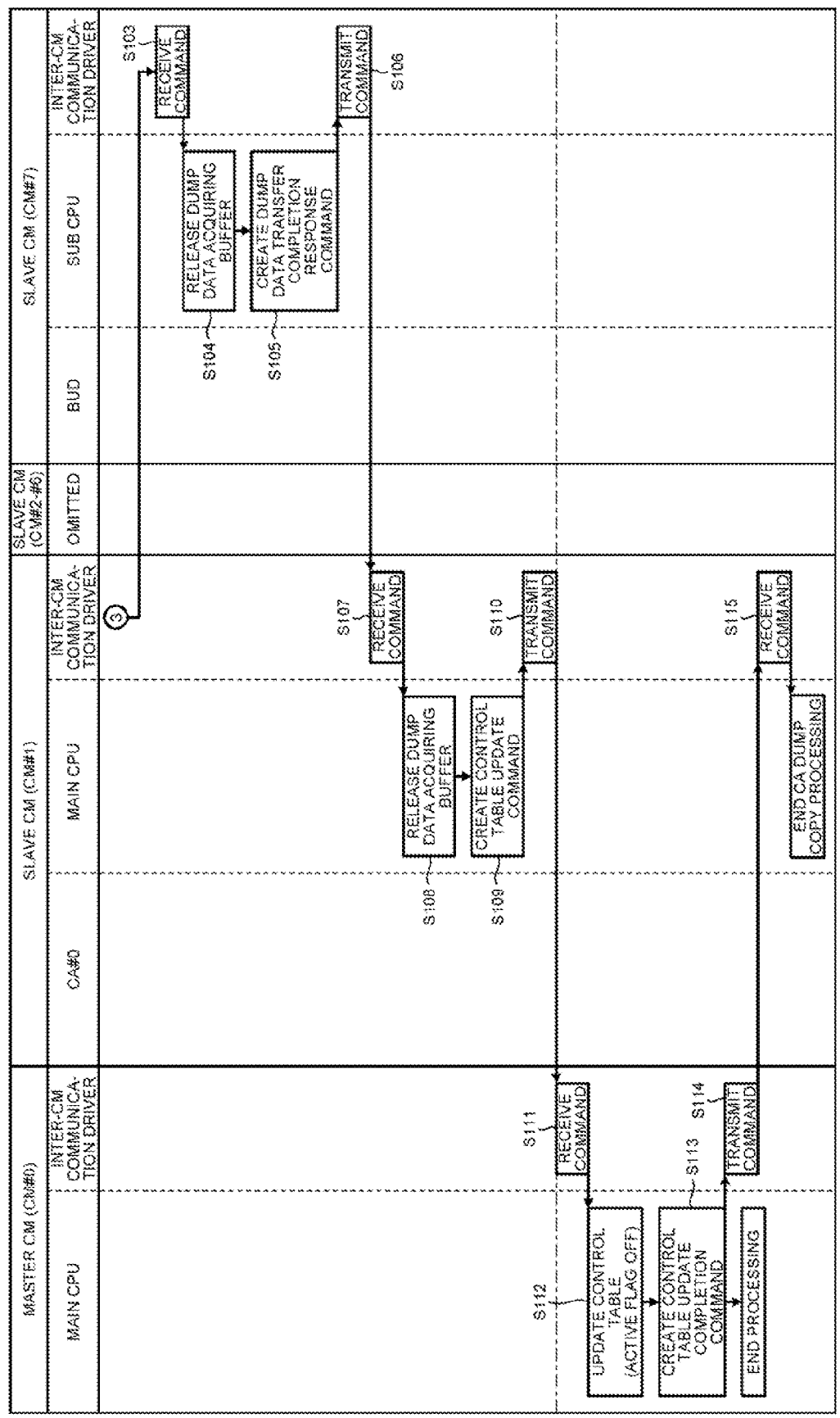
FIG. 10 is a sequence diagram (4) of the CA dump copy processing according to the third embodiment.

Next, a procedure of the copying destination determination processing of the copying destination determining unit 52 will be described with reference to FIGS. 6A and 6B. FIGS. 6A and 6B are views illustrating flowcharts of the copying destination determination processing according to the third embodiment. In addition, an index is assigned in advance to each copying destination target CPU. For example, "0" is assigned to a main CPU of CM #0, "1" is assigned to a sub CPU of CM #0, "2" is assigned to a main CPU of CM #1 and "3" is assigned to a sub CPU of CM #1.

For example, the copying destination determining unit 52 which has received a copying destination CPU acquisition command including the size of the dump data of CA #m0 calculates a standard copying time (CA dump copying time) from the size of the dump data (step S21). The CA dump copying time is calculated according to equation (1). Further, the copying destination determining unit 52 stores the calculated CA dump copying time in the copying control table 371.

Furthermore, the copying destination determining unit 52 acquires the usage rate of each CPU and the number of I/O commands from each CPU (step S22). The usage rate of each CPU is stored in the CPU usage rate information 372 of each CM. The number of I/O commands of each CPU is stored in the command count information 373 of each CM.

Further, the copying destination determining unit 52 calculates the copying execution time (CA dump copying execution time) of each CPU from the standard copying time and the usage rate of each CPU (step S23). The CA dump copying execution time is calculated according to equation (2). Further, the copying destination determining unit 52 stores the calculated CA dump copying execution time of each CPU in the copying control table 371.

Furthermore, the copying destination determining unit 52 calculates the I/O processing time of each CPU from the number of I/O commands (step S24). Still further, the copying destination determining unit 52 stores the calculated I/O processing time of each CPU in the copying control table 371.

Subsequently, the copying destination determining unit 52 sets a candidate CPU to a default value (for example, 0xFF) (step S25). In addition, the candidate CPU refers to a variable indicating a copying destination CPU candidate, and is set a value of an assigned to a candidate CPU. Further, the copying destination determining unit 52 sets a shortest storage time CPU as a default value (for example, 0xFF) (step S26). In addition, the shortest storage time CPU refers to a variable indicating a CPU which spends the shortest time to store dump data, and is set a value of the index assigned to the CPU of the shortest storage time.

Further, the copying destination determining unit 52 sets 0 which is an index value of the copying destination target CPU to Index, and sets the value set to Index, to the check CPU (step S27). In addition, Index is a variable, and is set a value of an index assigned to each CPU. Further, the check CPU refers to a variable indicating a CPU for which whether this CPU is a copying destination CPU is checked, and is set a value of an index assigned to the CPU.

Subsequently, the copying destination determining unit 52 decides whether or not the value set to Index is equal to the maximum number of copying destination target CPUs (step S28). When determining that the value set to Index is not equal to the maximum number of CPUs (No in step S28), the copying destination determining unit 52 proceeds to step S41.

In step S41, the copying destination determining unit 52 determines whether or not the active flag of the check CPU is ON, based on the active flag stored in the copying control table 371 (step S41). When determining that the active flag of the check CPU is ON (Yes in step S41), the copying destination determining unit 52 proceeds to step S49 to check the next CPU.

Meanwhile, when determining that the active flag of the check CPU is not ON (No in step S41), the copying destination determining unit 52 determines whether or not the shortest storage time CPU is a default value (step S42). When determining that the shortest storage time CPU is a default value (Yes in step S42), the copying destination determining unit 52 proceeds to step S44 to set the check CPU to the shortest storage time CPU.

When the shortest storage time CPU is not the default value (No in step S42), the copying destination determining unit 52 decides whether or not a CA copying execution time of the check CPU is the CA copying execution time of the shortest storage time CPU or less (step S43). When deciding that the CA copying execution time of the check CPU is the CA copying execution time of the shortest storage time CPU or less (Yes in step S43), the copying destination determining unit 52 proceeds to step S44 to set the check CPU to the shortest storage time CPU.

In step S44, the copying destination determining unit 52 sets the check CPU to the shortest storage time CPU (step S44). That is, the copying destination determining unit 52 sets the check CPU which is currently checked, as the CPU of the shortest storage time among the checked CPUs.

Meanwhile, when the check CPU is the CA copying execution time of the shortest storage time CPU or less (No in step S43), the copying destination determining unit 52 determines whether or not the CA copying execution time of the check CPU is a copying completion specified time or less (step S45). Meanwhile, the copying completion specified time refers to a specified time which is specified in advance and which is allowed for copying. When determining that the CA copying execution time of the check CPU is longer than the copying completion specified time (No in step S45), the copying destination determining unit 52 proceeds to step S49 to check the next CPU.

When deciding that the CA copying execution time of the check CPU is the copying completion specified time or less (Yes in step S45), the copying destination determining unit 52 determines whether or not the candidate CPU is a default value (step S46). When determining that the candidate CPU is not the default value (No in step S46), the copying destination determining unit 52 determines whether or not the I/O processing time of the check CPU is the I/O processing time of the candidate CPU or less (step S47). Meanwhile, when determining that the I/O processing time of the check CPU is longer than the I/O processing time of the candidate CPU (No in step S47), the copying destination determining unit 52 proceeds to step S49 to check the next CPU.

When the candidate CPU is the default value (Yes in step S46) or the I/O processing time of the check CPU is the I/O processing time of the candidate CPU or less (Yes in step S47), the copying destination determining unit 52 proceeds to step S48. In step S48, the copying destination determining unit 52 sets the check CPU to the candidate CPU (step S48). That is, the copying destination determining unit 52 sets the check CPU which is currently checked as the CPU which spends shorter CA copying execution time than the copying completion specified time and spends the shortest I/O processing time among the checked CPUs.

In step S49, the copying destination determining unit 52 adds 1 to Index, and updates the check CPU to Index (step S49). Further, the copying destination determining unit 52 proceeds to step S28.

Subsequently, when determining in step S28 that the value set to Index is equal to the maximum number of copying destination target CPUs (Yes in step S28), the copying destination determining unit 52 determines whether or not the candidate CPU is the default value (step S29). When determining that the candidate CPU is not the default value (No in step S29), the copying destination determining unit 52 determines the candidate CPU as the copying destination CPU (step S30), and finishes copying destination determination processing.

When determining that the candidate CPU is the default value (Yes in step S29), the copying destination determining unit 52 determines whether or not the shortest storage time CPU is the default value (step S31). That is, this is a case where there is not even one CPU which spends shorter CA copying execution than the copying completion specified time. Meanwhile, when determining that the shortest storage time CPU is not the default value (No in step S31), the copying destination determining unit 52 determines the shortest storage time CPU as the copying destination CPU (step S32), and finishes the copying destination determination processing.

Meanwhile, when determining that the shortest storage time CPU is the default value (Yes in step S31), the copying destination determining unit 52 determines that there is no candidate CPU for a copying destination CPU (step S33), and finishes the copying destination determination processing.

Sequence of CA Dump Copy Processing

Next, a sequence of the CA dump copy processing will be described with reference to FIGS. 7 to 10. FIGS. 7 to 10 are sequence diagrams illustrating CA dump copy processing according to the third embodiment. In addition, with a storage system 2B, CM #0 to CM #7 are made redundant, and CM #0 is a master CM. Further, it is assumed that abnormality further occurs in CA #0 of CM #1.

First, in CM #1, CA #0 in which abnormality has occurred starts degrade processing (S41), and notifies the main CPU (main control unit 34B) that the degrade processing is started (S42). Then, the main CPU receives a degrade notice (S43), and activates the CA dump copy processing performed by the copy processing unit 51 (S44). Further, the main CPU creates a copying destination CPU acquisition command indicating a request for acquiring the copying destination CPU (S45). The created command includes the size of dump data. Further, the main CPU transmits the created command to the master CM (CM #0) through the inter-CM communication driver 36 (S46).

In the master CM, when the inter-CM communication driver 36 receives the copying destination acquisition command transmitted from CM #1 (S47), copying destination CPU acquisition processing performed in the copying destination determining unit 52 is activated (S48). After activation, the main CPU (main control unit 34B) initializes the copying control table 371 (S49). Further, the main CPU calculates the CA dump copying time from the size of dump data (S50), and stores the calculated value in the copying control table 371 (S51). Meanwhile, the CA dump copying time is calculated according to equation (1). Further, the main CPU acquires the CPU usage rate of the local CM and the number of I/O commands which are being processed (S52), and creates a CPU information acquisition command for acquiring the same CPU information (S53). Furthermore, the main CPU transmits the created command to all CMs (CM #1 to CM #7) (S54 and S55).

In CM #1, when the inter-CM communication driver 36 receives the CPU information acquisition command transmitted from CM #0 (S56), the main CPU acquires the CPU usage rate of the local CM and the number of I/O commands which are being processed (S57). Further, the main CPU creates a response command to the CPU information acquisition command including the acquired CPU information (S58). Furthermore, the main CPU transmits the created command to the master CM (S59). The same processing as in CM #1 is performed in CM #2 to CM #7.

In the master CM, the inter-CM communication driver 36 receives from each CM the response command to the CPU information acquisition command (S60). Then, when the main CPU receives the response commands from all CMs (S61), the main CPU activates the copying destination determination processing performed in the copying destination determining unit 52 (S62). After activation, the main CPU calculates the CA dump copying execution time of each CPU from the CPU usage rate in CPU information acquired from each CM (S63), and stores the calculated values in the copying control table 371 (S64). Meanwhile, the CA dump copying execution time is calculated according to equation (2). Further, the main CPU calculates the I/O processing time of each CPU from the number of I/O commands in CPU information acquired from each CM (S65), and stores the calculated values in the copying control table (S66). Meanwhile, the I/O processing time is calculated according to equation (3).

Further, in the master CM, the main CPU determines the copying destination CPU based on information stored in the copying control table 371 (S67). Furthermore, the main CPU sets ON to the active flag of the determined copying destination CPU in the copying control table 371 (S68), and sets CM #1-CA #0 to the copying target CA (S69). Still further, the main CPU creates a response command corresponding to the copying destination CPU acquisition command including information about the determined copying destination CPU (S70), and transmits the created command to CM #1 (S71).

In CM #1, when the inter-CM communication driver 36 receives the response command corresponding to the copying destination CPU acquisition command (S72), the main CPU creates the CA dump storage request command (S73), and transmits the created command to the copying destination CPU (S74). Meanwhile, a sub CPU of CM #7 is assumed as the copying destination CPU.

In CM #7, when receiving the CA dump storage request command (S75), the inter-CM communication driver 36 passes the received command to the sub CPU. Then, the sub CPU secures a dump data acquiring buffer in a memory (S76). Further, the sub CPU creates the response command to the CA dump storage request command (S77), and transmits the created command to CM #1 (S78). Meanwhile, the created response command includes information related to the secured buffer address and buffer size.

In CM #1, the inter-CM communication driver 36 receives the response command to the CA dump storage request command (S79). Further, the main CPU secures the dump data acquiring buffer on the memory based on the buffer size included in the received command (S80), and notifies the secured buffer address and buffer size to CM #0 (S81). Furthermore, CM #0 stores the buffer address and the buffer size notified from the main CPU (S82). Then, CM #0 transfers stored dump data corresponding to the buffer size, to the main CPU (S83), and notifies that the dump data has been transferred (S84). When receiving a dump data transfer notice (S85), the main CPU transfers the dump data corresponding to the buffer size to the sub CPU of CM #7 which is the copying destination CPU (S86). Further, the main CPU creates the dump data transfer command that the dump data has been transferred (S87), transmits the created command to the sub CPU of CM #7 (S88).

In CM #7, when the inter-CM communication driver 36 receives the dump data transfer command from the main CPU of CM #1 (S89), the main CPU compresses dump data transferred from the main CPU of CM #1 (S90). Further, the sub CPU writes the compressed dump data in the BUD 33 in the local CM (S91 to S93). Furthermore, when writing of the compressed dump data in the BUD 33 is completed, the sub CPU creates a dump data storage completion command that storage of dump data is completed (S94), and transmits the created command to CM #1 (S95).

In CM #1, when the inter-CM communication driver 36 receives the dump data storage completion command from CM #7 (S96), the main CPU notifies to CA #0 that storage of dump data is completed (S97). Further, CA #0 determines whether or not there is subsequent dump data (S98), and, if there is the subsequent dump data (Yes in S98), proceeds to S83 to transfer the subsequent dump data. Meanwhile, if there is no subsequent dump data (No in S98), CA #0 notifies to the main CPU that transfer of the dump data is completed (S99). Further, when receiving the dump data transfer completion notice from CA #0 (S100), the main CPU creates the dump data transfer completion command that transfer of the dump data is completed (S101). Furthermore, the main CPU transmits the created command to CM #7 (S102).

In CM #7, when the inter-CM communication driver 36 receives the dump data transfer completion command from CM #1 (S103), the sub CPU releases the dump data buffer (S104). Further, the sub CPU creates the response command to the dump data transfer completion command (S105), and transmits the created command to CM #1 (S106).

In CM #1, when the inter-CM communication driver 36 receives the response command to the dump data transfer completion command from CM #7 (S107), the main CPU releases the dump data acquiring buffer (S108). Further, the main CPU creates a control table update command for updating the copying control table 371 (S109), and transmits the created command to the master CM (S110).

In the master CM, when the inter-CM communication driver 36 receives the control table update command from CM #1 (S111), the main CPU updates the active flag corresponding to the copying destination CPU, to OFF in the copying control table 371 (S112). Further, the main CPU creates a control table update completion command that an update of the copying control table 371 is completed (S113), and transmits the created command to CM #1 (S114).

In CM #1, when the inter-CM communication driver 36 receives the control table update completion command from the master CM (S115), the main CPU finishes the CA dump copy processing.

Meanwhile, content of the copying control table set to a default state in S49 will be specifically described. FIG. 11 is a view illustrating a specific example of a copying control table set to the default state in S49. As illustrated in FIG. 11, the copying control table 371 stores OFF indicating that the active flag 371$b$ is not active for all CPUs 371$a$ in the storage system 2B. Further, for all CPUs 371$a$ in the storage system 2B, the CA dump copying time 371$d$, the CA dump copying execution time 371$f$ and the I/O processing time 371$h$ store "0" second indicating the default state respectively.

Next, content of the copying control table in which the CA dump copying times are stored in S51 will be specifically described. FIG. 12 is a view illustrating a specific example of the copying control table in which the CA dump copying times are stored in S51. As illustrated in FIG. 12, the CA dump copying times 371$d$ are stored in the copying control table 371. The CA dump copying time 371$d$ is calculated as follows using equation (1) by the copying destination determining unit 52 of the master CM.

For example, an inter-CM/CA communication time is 0.1 second, an inter CM/CM communication time is 0.1 second, a data compressing time is 0.5 seconds/MB, a BUD storing time is 0.3 seconds/MB and a data size is 50 MB. In this case, a CA dump copying time in CM #1 which has CA #0 in which abnormality has occurred and a CA dump copying time in CM other than CM #1 which does not have CA #0 are calculated as follows.

CA dump copying time in CM #1={0.1+0.5+0.3}× 50=45 (seconds)

CA dump copying time in CM other than CM #1={0.1+0.1+0.5+0.3}×50=50 (seconds)

That is, in CM other than CM #1 which has CA #0 in which abnormality has occurred spends an inter-CM/CM communication time to transfer dump data from CM #1 to CM other than CM #1. Thus, the CA dump copying time in CM other than CM #1 spends a longer CA dump copying time than the CA dump copying time in CM #1.

Figure 13:
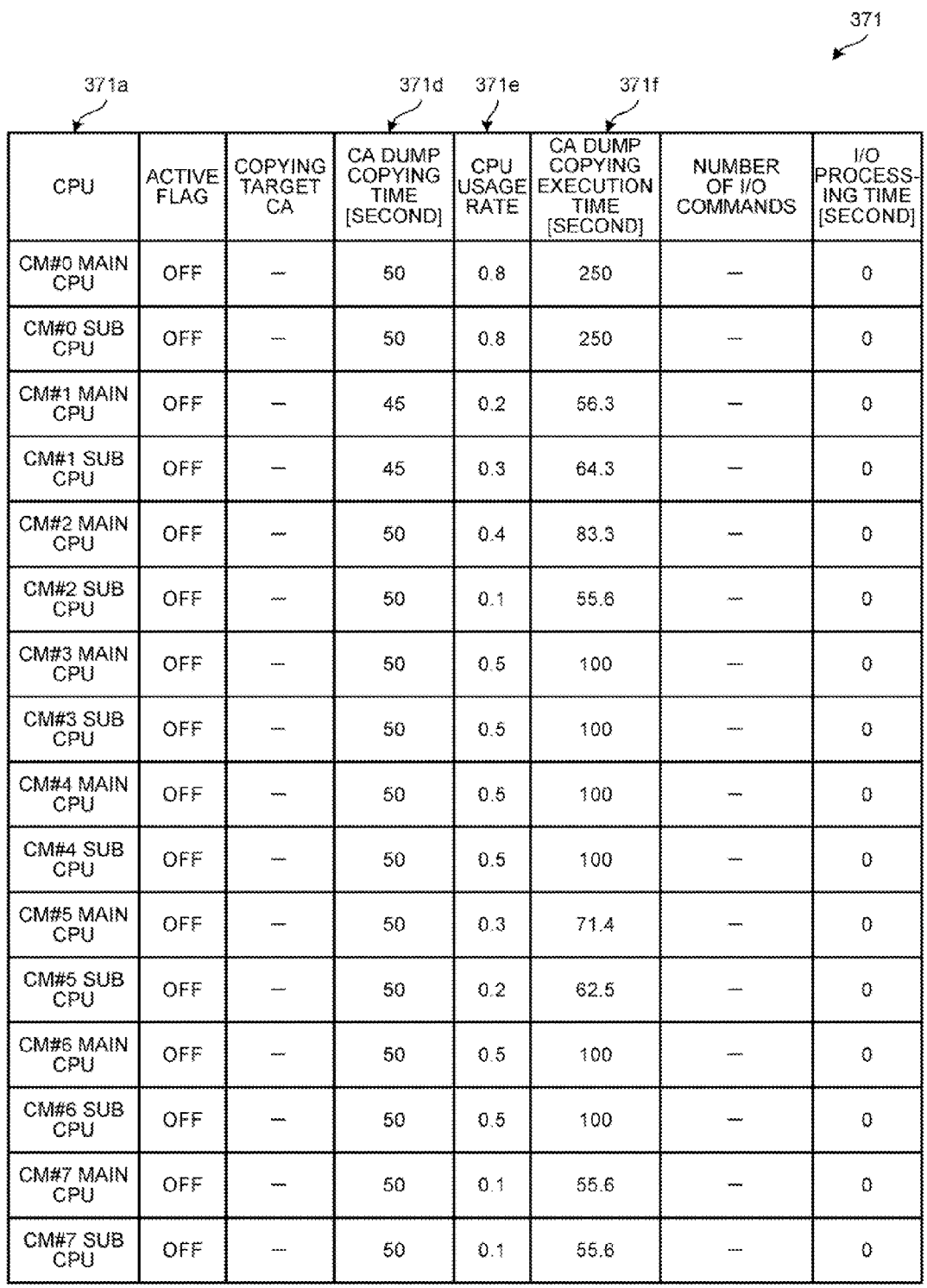
FIG. 13 is a view illustrating a specific example of a copying control table in which CA dump copying execution times are stored in S64.

Next, content of the copying control table in which the CA dump copying execution times are stored in S64 will be specifically described. FIG. 13 is a view illustrating a specific example of the copying control table in which the CA dump copying execution times are stored in S64. As illustrated in FIG. 13, the CPU usage rates 371$e$ and the CA dump copying execution times 371$f$ are further stored in the copying control table 371. The CA dump copying execution time 371$f$ is calculated as follows by the copying destination determining unit 52 of the master CM using equation (2).

For example, the CA dump copying execution time in the main CPU of CM #0 is calculated as follows. Meanwhile, the CA dump copying time is 50 seconds, and the CPU usage rate is 0.8

CA dump copying execution time=50÷(1−0.8)=250 (seconds)

Further, the CA dump copying execution time in the sub CPU of CM #7 is calculated as follows.

CA dump copying execution time=50÷(1−0.1)=55.6 (seconds)

Next, content of the copying control table in which the I/O processing times are stored in S66 will be specifically described. FIG. 14 is a view illustrating a specific example of the copying control table in which the I/O processing times are stored in S66. As illustrated in FIG. 14, the numbers of I/O commands 371$g$ and the I/O processing times 371$h$ are further stored in the copying control table 371. The CA dump copying time 371$d$ is calculated as follows by the copying destination determining unit 52 of the master CM using equation (3).

For example, the I/O processing time in the main CPU of CM #0 is calculated as follows. Meanwhile, the number of input/output commands of cross access is 100, the number of input/output commands of straight access is 100 and input/output command processing times of cross access and straight access are both 0.01 second.

I/O processing time=100×0.01+100×0.01=2 (seconds)

Next, content of the copying control table in which the copying destination CPUs are reflected in S68 and S69 will be specifically described. FIG. 15 is a view illustrating a specific example of the copying control table in which the copying destination CPUs are reflected in S68 and S69. As illustrated in FIG. 15, ONs indicating that the active flag 371$b$ is active for the sub CPU of CM #7 are stored in the copying control table 371. Further, for the sub CPU of CM #7, "CM #1-CA #0" for which the copying target CA371$c$ is a copying target is stored. The copying destination CPU of the copying target CA is determined by the copying destination determining unit 52 of the master CM.

For example, the copying completion specified time is 70 seconds. Meanwhile, CPUs which spends the shorter CA dump copying execution time 371f than the copying completion specified time are the main CPU and the sub CPU of CM #1, the sub CPU of CM #2, the sub CPU of CM #5, and the main CPU and the sub CPU of CM #7. The CPU of the shortest I/O processing time among these CPUs is the sub CPU of CM #7. Hence, the copying destination CPU of the copying target CM #0 of CM #1 is determined to be the sub CPU of CM #7. Then, ON is stored in the active flag 371b corresponding to the determined sub CPU of CM #7, and the copying target "CM #1-CA #0" is stored in the copying target CA 371c.

Finally, content of the copying control table in which active flags are updated in S112 after copying is completed will be specifically described. FIG. 16 is a view illustrating a specific example of the copying control table in which the active flags are updated in S112 after copying is completed. As illustrated in FIG. 16, OFFS indicating that the active flag 371b is not active for the sub CPU of CM #7 are stored in the copying control table 371. Further, the copying target CA371c is cleared for the sub CPU of CM #7.

Effect According to Third Embodiment

According to the above third embodiment, when there are a plurality of external control unit candidates which are requested to copy dump data, the main control unit 34B narrows down copying destination candidates to control units which spend shorter copying times of data of a CA from which abnormality has been further detected than a copying completion specified time. Further, the main control unit 34B determines the copying destination as the control unit which spends the shortest I/O processing time converted from the number of I/O commands among the copying destination candidates which are narrowed down. Furthermore, the main control unit 34B requests the determined control unit to copy dump data of the CA from which abnormality has been further detected. As a result, the main control unit 34B can reliably copy the dump data of the CA from which abnormality has been further detected, within the specified time. Further, the main control unit 34B can reduce an influence on I/O processing of the entire storage system 2B.

Further, according to the third embodiment, when there is not even one control unit which spends shorter copying time of data of CA from which abnormality has been further detected than the rip completion specified time, the main control unit 34B determines the control unit of the shortest I/O processing time. As a result, the main control unit 34B can have the determined control unit copy dump data by the copying completion specified time, and check abnormality using dump data which can be copied.

Others

In addition, although the copying destination determining unit 52 is arranged in the main control unit 34B of the master CM, the copying destination determining unit 52 is not limited to this, and may be arranged in the main control unit 34B of each CM. In this case, in a CM which has a CA in which abnormality has occurred, the copying destination determining unit 52 determines an external control unit which copies dump data of the CA in which abnormality has further occurred in a local CM. Further, in the CM which has the CA in which abnormality has occurred, the copy processing unit 51 requests the determined control unit to perform copying.

Furthermore, each component of CM 3B does not necessarily need to be configured as physically illustrated. That is, specific modes of distribution and integration of CM 3, 3A and 3B are not limited to illustrated ones, and the entirety or part of the specific modes can be functionally or physically distributed and integrated in arbitrary units according to, for example, various loads and a use situation. For example, the copying destination determining unit 52 and the copy processing unit 51 may be integrated as one unit, and arranged in each CM. Further, the copying destination determining unit 52 may be distributed to a first processing unit which predicts whether or not it is possible to copy dump data within the specified time, and a second processing unit which determines a control unit of the shortest I/O processing time among candidates which are predicted to be capable of performing copying. Furthermore, the memory unit 37 may be connected as an external device of CM 3B through a network.

Still further, the entirety or arbitrary part of each processing function performed in CM 3, 3A and #B may be realized by a CPU (or a microcomputer such as a MPU or a MCU (Micro Controller Unit)) or hardware based on a wired logic. Moreover, the entirety or arbitrary part of each processing function performed in CM 3, 3A and 3B may be realized by a program which is analyzed and executed by the CPU (or a microcomputer such a MPU or a MCU).

According to one aspect of the storage system disclosed in the present application, there is provided an effect of, even when failure occurs in a plurality of interfaces at the same period in one control device, being capable of copying dump data of a plurality of interfaces in which failure has occurred, within a specified period.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
  a memory device that stores data; and
  a control device that controls an input and an output of data to and from the memory device, the control device including
    a first processing unit and a second processing unit that distribute and execute processing in the control device; and
    a plurality of interface units that receive commands related to the input and the output of the data stored in the memory device from an external device,
  the first processing unit copies dump data of a first interface unit among the plurality of interface units when the first processing unit detects abnormality of the first interface unit and is not copying dump data of another interface unit, and requests the second processing unit to copy the dump data of the first interface unit when the first processing unit detects abnormality of the first interface unit and is copying dump data of another interface unit.

2. The storage system according to claim 1, wherein the first processing unit requests, when the first processing unit detects abnormality of the first interface unit and both of the first processing unit and the second processing unit are copying dump data of other interface units, a processing unit of an external control device to copy the dump data of the first interface unit.

3. A storage system comprising:
a memory device that stores data; and
a control device that controls an input and an output of data to and from the memory device, the control device including
a first processing unit and a second processing unit that distribute and execute processing in the control device; and
a plurality of interface units that receive commands related to the input and the output of the data stored in the memory device from an external device,
the first processing unit requests the second processing unit to copy dump data of a first interface unit among the plurality of interface units when detecting an abnormality of the first interface unit while copying dump data of another interface unit, and
the first processing unit selects, when there is a plurality of external control devices each with a processing unit, one processing unit which is capable of copying the dump data of the first interface unit in a shorter time than a predetermined time and whose processing time, calculated based on a number of commands related to the input and the output, is shortest among the processing units of the external control devices, and requests the selected processing unit to copy the dump data of the first interface unit.

4. The storage system according to claim 3, wherein the first processing unit selects, when none of the processing units is capable of copying the dump data of the first interface unit in a shorter time than the predetermined time, a processing unit whose processing time calculated based on the number of commands related to the input and the output is shortest among the processing units.

5. A control device that controls an input and an output of data to and from a memory device that stores data, the control device comprising:
a first processing unit and a second processing unit that distribute and execute processing in the control device; and
a plurality of interface units that receive commands related to the input and the output of the data stored in the memory device from an external device,
the first processing unit copies dump data of a first interface unit among the plurality of interface units when the first processing unit detects abnormality of the first interface unit and is not copying dump data of another interface unit, and requests the second processing unit to copy the dump data of the first interface unit when the first processing unit detects abnormality of the first interface unit and is copying dump data of another interface unit.

6. A method of controlling a storage system that includes a memory device and a control device, the method comprising:
copying, by a first processing unit of the control device, dump data of a first interface unit, when abnormality of the first interface unit among a plurality of interface units is detected and dump data of another interface unit is not being copied by the first processing unit, the plurality of interface units being provided in the control device to receive commands related to an input and an output of data stored in the memory device from an external device;
requesting, by the first processing unit, a second processing unit of the control device to copy the dump data of the first interface unit, when abnormality of the first interface unit is detected and dump data of another interface unit is being copied by the first processing unit.

* * * * *